United States Patent
Suzuki

(10) Patent No.: US 6,293,241 B1
(45) Date of Patent: Sep. 25, 2001

(54) INTERNAL COMBUSTION ENGINE WITH COMBUSTION HEATER

(75) Inventor: Makoto Suzuki, Mishima (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 09/470,125

(22) Filed: Dec. 22, 1999

(30) Foreign Application Priority Data

Dec. 24, 1998 (JP) .................................................. 10-365986
May 14, 1999 (JP) .................................................. 11-133598

(51) Int. Cl.$^7$ .............................. F02N 17/02; F02G 5/00
(52) U.S. Cl. ...................................... 123/142.5 R; 123/550
(58) Field of Search ........................ 123/142.5 R, 568.12, 123/568.15, 568.18, 568.19, 568.31, 543, 550, 556, 41.14, 557

(56) References Cited

U.S. PATENT DOCUMENTS

| | | | |
|---|---|---|---|
| 4,749,028 | * 6/1988 | Okura et al. | 165/42 |
| 4,858,825 | * 8/1989 | Kawamura | 237/2 A |
| 4,927,077 | * 5/1990 | Okada | 237/2 A |
| 5,048,752 | * 9/1991 | Hintennach et al. | 237/2 A |
| 6,055,964 | * 5/2000 | Suzuki | 123/550 |
| 6,131,553 | * 10/2000 | Suzuki | 123/556 |
| 6,178,938 | * 1/2001 | Suzuki | 123/142.5 |

FOREIGN PATENT DOCUMENTS 60-78819   5/1985 (JP).
63-71412  10/1995 (JP).

* cited by examiner

Primary Examiner—Noah P. Kamen
Assistant Examiner—Hai Huynh

(57) ABSTRACT

In an internal combustion engine with a combustion heater for elevating a temperature of an engine related element, an object of the present invention is to provide a technique that may effectively performs temperature elevation of an exhaust gas purifying device. In order to attain this object, according to the present invention, the internal combustion engine having an exhaust gas purifying catalyst provided in an exhaust passage of the internal combustion engine, and a combustion heater comprising a combustion chamber and a heat exchange portion for transmitting to an engine related element heat held by burnt gas that has been burnt in said combustion chamber, characterized by including a first burnt gas discharging portion for discharging from the combustion heater the burnt gas which has passed through the heat exhcange portion, a second burnt gas discharging portion for discharging from the combustion heater the burnt gas which has not yet passed through the heat exchange portion, and a burnt gas passage controlling unit for supplying at least one of burnt gas discharged by the first burnt gas discharging portion and burnt gas discharged by the second burnt gas discharging portion to the exhaust gas purifying catalyst.

4 Claims, 13 Drawing Sheets

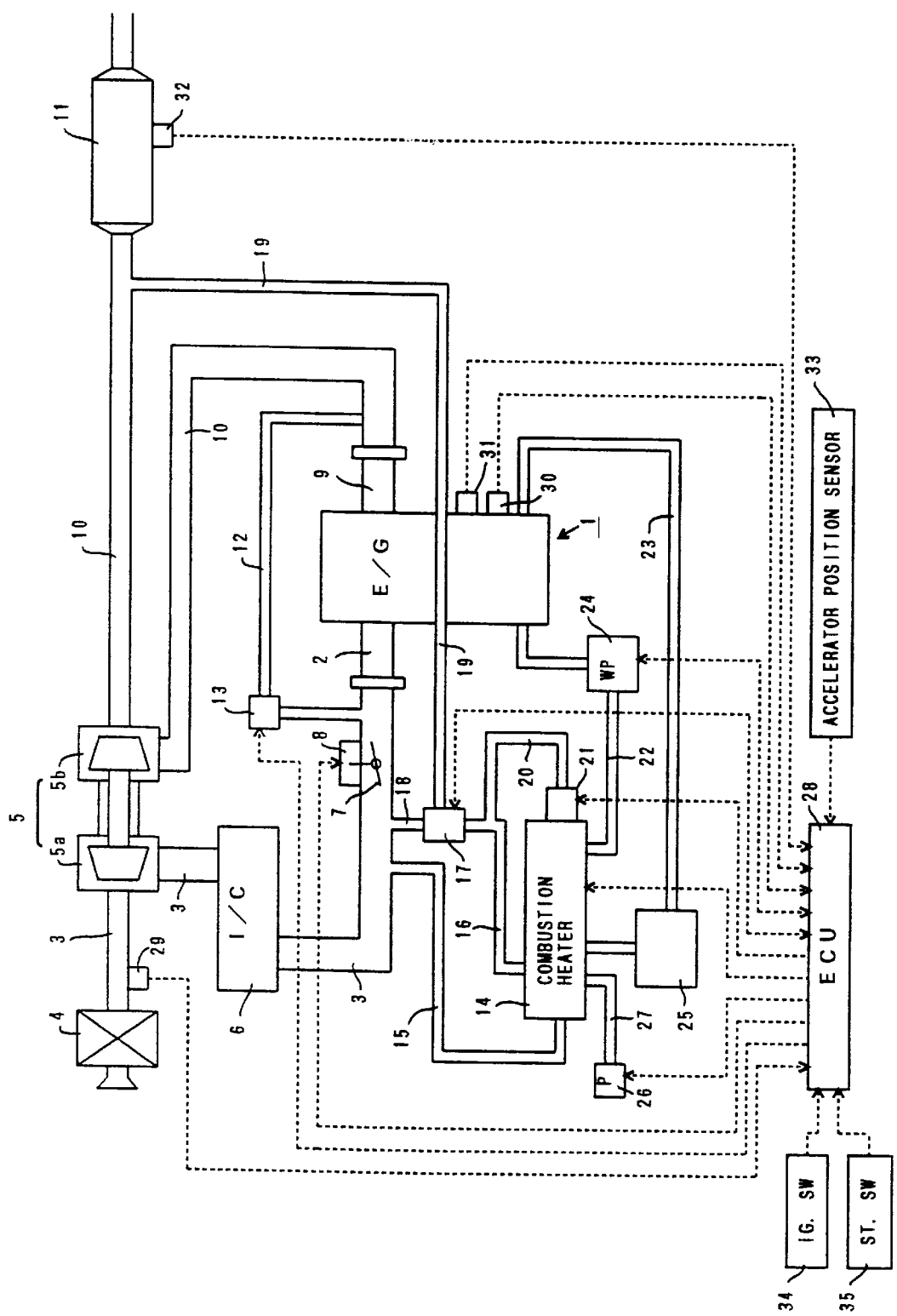
F I G. 1

INTERNAL COMBUSTION ENGINE WITH COMBUSTION HEATER

BACKGROUND OF THE INVENTION

1. Field of the Invention

The present invention relates to an internal combustion engine provided with a combustion heater for elevating a temperature of an engine related element such as cooling water or intake air.

2. Description of the Related Art

In an internal combustion engine to be mounted on an automotive vehicle or the like, in particular, an internal combustion engine such as a diesel engine in which a heat quantity is likely to be small, a technique to additionally provide a combustion heater for the purpose of acceleration of warming up the internal combustion engine or enhancement of a passenger room heating device in a cold state.

The above-described combustion heater is provided with a combustion chamber which is independent of the internal combustion engine. Furthermore, the combustion heater is provided with a heat exchange portion composed of a water path formed so as to surround the combustion chamber.

The water path (water path in the heater) of the above-described heat exchanger and a cooling path of the internal combustion engine are in communication with each other through a cooling water leading path for introducing the cooling water from the cooling path of the internal combustion engine to the water path in the heater and a cooling water discharge passage for introducing the cooling water from the water path in the heater to the cooling path of the internal combustion engine. A heater core of the passenger room heating device is provided in the midway of the cooling water discharge passage.

In the thus constructed combustion heater, a part of fuel of the internal combustion engine is burnt in the combustion chamber in a cold state or the like of the internal combustion engine, and at the same time, the cooling water for the internal combustion engine is introduced to the water path in the heater through the cooling water leading path.

In this case, the heat generated as a result of the combustion within the combustion chamber is transferred to the cooling water in the heat exchanger portion to elevate the temperature of the cooling water. The cooling water (hot water) which has been heated in the heat exchange portion is discharged from the water path in the heater to the cooling water discharge passage to be returned back to the cooling water path through the heater core. When the above-described hot water has passed through the heater core, a part of heat of the hot water is transferred to the heating air that flows through the heater core, thereby the temperature of the heating air being elevated.

According to the above-described combustion heater, it is possible to elevate the temperature of the heating air or the engine cooling water in an earlier stage in the cooling operation of the internal combustion engine and it is possible to enhance the acceleration of the warmup of the engine and the heating capacity.

However, in the combustion heater, since the combustion is conducted by utilizing the part of the fuel for the internal combustion engine, there are cases where the burnt gas emitted from the combustion heater contains harmful gas components like the emission of the internal combustion engine. In those cases, it is necessary to discharge the emission after purifying the harmful gas components contained in the burnt gas.

In order to meet such a requirement, Japanese Patent Application Laid-Open No. Sho 60-78819 describes "HEATING DEVICE FOR A VEHICLE PROVIDED WITH A COMBUSTION HEATER". In the heating device disclosed in this publication, an exhaust port of a heater exhaust pipe for discharging the gas burnt in the combustion heater is provided upstream of the exhaust gas purifying device of the exhaust pipe of the internal combustion engine, and the burnt gas to be discharged from the combustion heater is introduced into the exhaust gas purifying device for the internal combustion engine to thereby purify the harmful gas components contained in the burnt gas with the exhaust gas purifying device for the internal combustion engine.

It is possible to exemplify a three-element catalyst, an adsorption reduction type lean NOx catalyst, a selective reduction type lean NOx catalyst or the like for the exhaust gas purifying device of the internal combustion engine. However, since these exhaust gas purifying devices are activated so that the harmful gas components contained in the exhaust gas may be purified when the catalyst bed temperature exceeds a predetermined level, in order to positively purify the burnt gas from the combustion heater and the exhaust gas from the internal combustion engine, it is necessary to keep the exhaust gas purifying devices at the activation temperature or more.

However, in the case where the internal combustion engine is a diesel engine, a heat generation amount of the internal combustion engine tends to be small in a low load operational region, and the exhaust gas temperature is likely to be low. Accordingly, it is difficult to keep the exhaust gas purifying device at the activation temperature or more only by the exhaust gas of the internal combustion engine.

In contrast, as in Japanese Patent Application Laid-Open No. Sho 60-78819 entitled "HEATING DEVICE FOR A VEHICLE PROVIDED WITH A COMBUSTION HEATER", it is possible to propose that the burnt gas that is relatively high in temperature from the combustion heater is introduced into the exhaust gas purifying device to thereby elevate the temperature of the exhaust gas purifying device. However, since the temperature of the exhaust gas to be discharged from the above-described combustion heater is lowered by the heat exchange with the heating air in the heat exchange portion, there is a problem in that it takes long time to elevate the temperature of the exhaust gas purifying device up to the activation temperature, and the exhaust emission would become worse in the meantime.

SUMMARY OF THE INVENTION

In order to overcome the above-noted defects, an object of the present invention is to provide a technique that may provide an internal combustion engine provided with a combustion heater for elevating a temperature of an engine related element by supplying a burnt gas having a large heat quantity to an internal engine of an exhaust gas purifying device, to thereby effectively perform temperature elevation of the exhaust gas purifying device and warmup acceleration of the internal combustion engine.

In order to attain the above-described object, the resent invention adopts the following means.

Namely, an internal combustion engine with a combustion heater according to the present invention, comprises:

an exhaust gas purifying catalyst provided in an exhaust passage of the internal combustion engine for purifying harmful gaseous components contained in exhaust gas;

a combustion heater including a combustion chamber that is independent of the internal combustion engine and a heat exchange portion for transmitting to an engine related element heat held by burnt gas that has been burnt in the combustion chamber;

a first burnt gas discharging means for discharging from the combustion heater the burnt gas which has passed through the heat exchange portion;

a second burnt gas discharging means for discharging from the combustion heater the burnt gas that has not yet passed through the heat exchange portion or that has passed through a part of the heat exchange portion; and a burnt gas passage controlling means for communicating at least one of the first burnt gas discharging means and the second burnt gas discharging means with a portion upstream of the exhaust gas purifying catalyst in the exhaust passage.

In the thus constructed internal combustion engine with a combustion heater, the relatively low temperature burnt gas through the heat exchange portion in the combustion heater and the relatively high temperature burnt gas that has not passed through the heat exchange portion are fed to the exhaust passage upstream of the exhaust gas purifying catalyst as desired.

For example, in the case where the temperature of the engine related element is to be elevated, the burnt gas passage controlling means communicates the first burnt gas discharging means and the exhaust passage upstream of the exhaust gas purifying catalyst with each other. In this case, the burnt gas that has been burnt in the combustion chamber of the combustion heater has passed through the heat exchange portion and thereafter is fed to the exhaust passage through the first burnt gas discharging means. While the burnt gas passes through the heat exchange portion, the heat of the burnt gas is transmitted to the engine related element to elevate the temperature of the engine related element.

Also, in the case where the temperature of the exhaust gas purifying catalyst is to be elevated, the burnt gas passage controlling means communicates the second burnt gas discharging means and the exhaust passage upstream of the exhaust gas purifying catalyst with each other. In this case, the burnt gas that has not passed through the heat exchange portion is fed to the exhaust passage through the second burnt gas discharging means. Since the burnt gas that has not passed the heat exchange portion has a high temperature in comparison with the burnt gas that has passed through the heat exchange portion, if such a high temperature burnt gas is fed to the exhaust passage upstream of the exhaust gas purifying catalyst, the temperature of the exhaust gas purifying catalyst is elevated earlier.

Incidentally, the above-described internal combustion engine with a combustion heater may further comprise an intake throttle valve for reducing an amount of intake air flowing through an intake passage of the internal combustion engine if the second burnt gas discharging means is in communication with the portion upstream of the exhaust gas purifying catalyst in the exhaust passage.

The reason for this is that, in an internal combustion engine such as a diesel engine in which a combustion temperature is low in a low load operational region and an exhaust gas temperature is likely to be low, since there are cases that the exhaust purifying catalyst is cooled by the low temperature exhaust gas, it is necessary to reduce the exhaust gas amount to be discharged from the internal combustion engine by reducing the intake air amount of the internal combustion engine in order to elevate the temperature of the exhaust gas purifying catalyst.

As the internal combustion engine with a combustion heater according to the present invention, it is possible to exemplify one provided an intake air introducing passage for introducing the air for combustion from the intake passage to the combustion chamber of the combustion heater. In the case where a supercharger is provided in the intake passage of the internal combustion engine, it is preferable that the above-described intake air introducing passage is connected to a portion downstream of the supercharger in the intake passage.

The reason for this is that, since there are some cases that the pressure of the intake passage upstream of the supercharger is lower than the pressure of the exhaust passage upstream of the exhaust gas purifying catalyst, when the intake air introducing passage is connected to the portion upstream of the supercharger in the intake passage, it is assumed that the exhaust gas flowing through the exhaust passage upstream of the exhaust gas purifying catalyst is caused to reversely flow from the first burnt gas discharging means or the second burnt gas discharging means through the combustion heater and the intake air introducing passage to the intake passage.

Next, an internal combustion engine with a combustion heater according to the present invention may comprises:

a combustion heater including a combustion chamber that is independent of the internal combustion engine and a heat exchange portion for transmitting to an engine related element heat held by burnt gas that has been burnt in the combustion chamber;

a first burnt gas discharging means for discharging from the combustion heater the burnt gas which has passed through the heat exchange portion;

a second burnt gas discharging means for discharging from the combustion heater the burnt gas that has not yet passed through the heat exchange portion or that has passed through a part of the heat exchange portion;

an intake air introducing passage for introducing air for combustion from an intake passage of the internal combustion engine to the combustion heater;

a first burnt gas passage for communicating the first burnt gas discharging means with a joint portion downstream of the intake air introducing passage in the intake passage;

a second burnt gas passage for communicating the second burnt gas discharging means with a joint portion downstream of the first burnt gas passage in the intake passage; and a burnt gas passage controlling means for controlling of a flow of gas in the second burnt gas passage.

In this case, it is preferable that the joint portion between the intake passage and the second burnt gas passage is selected to a position where the pressure may be lower than that of the joint portion of the first burnt gas passage and that of the intake passage introducing passage in the intake passage.

In the case where the supercharger is provided in the intake passage of the internal combustion engine, it is preferable to provide the intake air introducing passage downstream of the supercharger.

In the thus constructed internal combustion engine with a combustion heater, the burnt gas passage controlling means communicates the second burnt gas passage when a temperature of the body of the engine or a temperature of the engine related element is to be elevated.

In this case, since the intake air introducing passage, the first burnt gas passage and the second burnt gas passage are in communication, applied to the combustion heater are the pressure in the vicinity of the joint portion of the intake air introducing passage in the intake passage, the pressure in the vicinity of the joint portion of the first burnt gas passage in the intake passage and the pressure in the vicinity of the joint portion of the second burnt gas passage in the intake passage.

The pressure of the pressure in the vicinity of the joint portion of the second burnt gas passage in the intake passage is lower than the pressure in the vicinity of the joint portion of the intake air introducing passage in the intake passage and lower than the pressure in the vicinity of the joint portion of the first burnt gas passage in the intake passage. For this reason, the air is introduced from the intake passage through the intake air introducing passage to the combustion heater and at the same time the air is introduced from the intake passage through the first burnt gas passage to the combustion heater. The air that has been introduced through the intake air introducing passage and the first bunt gas passage to the combustion heater is discharged through the second burnt gas exhaust means and the second burnt gas passage to the intake passage.

Here it should be noted that the combustion heater is provided with a gas passage for introducing the air from the intake air introducing passage to the combustion chamber and subsequently introducing the air from the combustion chamber to the heat exchange portion, the first burnt gas discharging means is constructed to discharge the burnt gas from the gas flow passage downstream of the heat exchange portion, and the second burnt gas discharging means is constructed to discharge the burnt gas from the gas flow passage upstream of the heat exchange portion.

The air that has been introduced into the combustion heater through the intake air introducing passage reaches the second burnt gas discharging means through the combustion chamber (The air reaches the combustion chamber from the intake passage through the intake air introducing passage will hereinafter be referred to as the air for combustion). The air that has been introduced into the combustion heater through the first burnt gas passage reversely flows through the heat exchange portion and reaches the second burnt gas discharging means (The air that reaches the second burnt gas discharging means through the heat exchange portion and the first burnt gas discharging means from the intake passage will hereinafter be referred to as secondary air).

If the above-described secondary air is fed to the second burnt gas discharging means located downstream of the combustion chamber, even if the pressure difference between the joint portion of the second burnt gas passage and the joint portion of the intake air introducing passage in the intake passage is increased, the pressure difference between the upstream side and the downstream side of the combustion chamber is suppressed. As a result, the flow rate and the flow amount of the gas passing through the combustion chamber are not increased excessively and the combustion within the combustion chamber is stabilized.

Also, in the combustion heater, the air for combustion introduced into the combustion chamber is burnt together with predetermined fuel. The burnt gas that has been burnt in the combustion chamber is discharged from the combustion chamber to the gas flow path. At this time, since the burnt gas is prevented from entering the heat exchange portion by the secondary air reversely flowing the heat exchange portion, the burnt gas reaches the second burnt gas discharging means without passing through the heat exchange portion. Accordingly, the burnt gas discharged from the combustion chamber is not used for heat exchange with the engine related element and the heat quantity of the burnt gas is increased.

Subsequently, the second burnt gas discharging means discharges the mixture gas of the above-described secondary gas and burnt gas. The burnt gas that has been discharged from the second gas burnt gas discharging means is fed to the intake passage through the second burnt gas passage. The mixture gas fed to the intake passage is introduced into the internal combustion engine through the intake passage.

Since the above-described mixture gas has the heat quantity that is substantially equal to that of the burnt gas bur has a lower temperature than that of the burnt gas, none of the second burnt gas discharging means, the second burnt gas passage and the burnt gas passage controlling means or the like are not excessively elevated. Furthermore, the atmospheric temperature within the sleeve of the internal combustion engine is elevated by the relatively large heat quantity possesses by the mixture gas.

Incidentally, as described above, in the case where the intake air introducing passage, the first burnt gas passage and the second burnt gas passage are connected in order from the upstream side to the downstream side of the intake passage, it is possible to provide an intake throttle valve between the joint portion of the first burnt gas passage in the intake passage of the internal combustion engine and the joint portion of the second burnt gas passage in the intake passage of the internal combustion engine for adjusting a flow rate of the intake air flowing through the intake passage.

With such an arrangement, by throttling the opening degree of the intake throttle valve after the start of the internal combustion engine in the cold start of the internal combustion engine (in cranking) or the like, the joint portion of the second burnt gas discharging passage in the intake passage may be kept at a lower pressure than that of the joint portion of the intake air introducing passage and the joint portion of the first burnt gas passage in the intake passage.

In this case, the air for combustion is fed from the intake passage through the intake air introducing passage into the combustion heater, and at the same time, the secondary air is fed from the intake passage through the first burnt gas passage into the combustion heater. The combustion heater discharges the mixture of the burnt gas having a large heat quantity and the secondary air having a high oxygen concentration to the intake passage through the second burnt gas passage.

As a result, it is possible to keep the necessary amount of oxygen for the engine combustion by the oxygen contained in the secondary air in the mixture gas while elevating the temperature of the atmosphere within the sleeve of the internal combustion engine by the heat held by the burnt gas in the above-described mixture gas.

The internal combustion engine with a combustion heater according to the present invention, the burnt gas passage controlling means also communicates the second burnt gas passage when temperature elevation demand of an exhaust gas purifying catalyst provided in the exhaust passage of the internal combustion engine occurs.

In this case, the combustion heater discharges the mixture gas of the secondary air and the burnt gas having the large heat quantify. The mixture gas is fed through the second bunt gas passage to the intake passage.

As a result, it is possible to elevate the intake air temperature while preventing the thermal damage of the internal combustion engine body or the intake system of the internal combustion engine to thereby elevate the exhaust gas temperature of the internal combustion engine to elevate the temperature of the exhaust gas purifying catalyst.

In this case, if the amount of the intake air of the internal combustion engine is decreased by the intake throttle valve, even if the amount of the gas discharged from the combustion heater is small, it is impossible to sufficiently elevate the temperature of the intake air and to reduce the amount of fuel consumption for the operation of the combustion heater.

Next, an internal combustion engine with a combustion heater according to the present invention may comprise:

an exhaust gas purifying catalyst provided in an exhaust passage of the internal combustion engine for purifying harmful gaseous components contained in exhaust gas;

a combustion heater including a combustion chamber that is independent of the internal combustion engine and a heat exchange portion for transmitting to an engine related element heat held by burnt gas that has been burnt in the combustion chamber;

a first burnt gas discharging means for discharging from the combustion heater the burnt gas which has passed through the heat exchange portion;

a second burnt gas discharging means for discharging from the combustion heater the burnt gas that has not yet passed through the heat exchange portion or that has passed through a part of the heat exchange portion;

an intake air introducing passage for introducing air for combustion from an intake passage of the internal combustion engine to the combustion heater;

a first burnt gas passage for communicating the first burnt gas discharging means with a joint portion downstream of the intake air introducing passage in the intake passage;

a second burnt gas passage for communicating the second burnt gas discharging means with an exhaust passage upstream of the exhaust gas purifying catalyst; and a burnt gas passage controlling means for controlling of a flow of gas in the second burnt gas passage.

In this case, it is preferable that the joint portion the second burnt gas passage in the intake passage is selected to a position where the pressure may be lower than that of the joint portion of the first burnt gas passage and that of the intake passage introducing passage in the intake passage.

Also, in the case where the supercharger is provided in the intake passage of the internal combustion engine, it is preferable to provide the intake air introducing passage downstream of the supercharger.

The internal combustion engine with a combustion heater according to the present invention, the burnt gas passage controlling means communicates the second burnt gas passage when temperature elevation demand of an exhaust gas purifying catalyst provided in the exhaust passage of the internal combustion engine occurs.

In this case, since the intake air introducing passage, the first burnt gas passage and the second burnt gas passage are in communication, applied to the combustion heater are the pressure in the vicinity of the joint portion of the intake air introducing passage in the intake passage, the pressure in the vicinity of the joint portion of the first burnt gas passage in the intake passage and the pressure in the vicinity of the joint portion of the second burnt gas passage in the intake passage.

The pressure of the pressure in the vicinity of the joint portion of the second burnt gas passage in the intake passage is lower than the pressure in the vicinity of the joint portion of the intake air introducing passage in the intake passage and also lower than the pressure in the vicinity of the joint portion of the first burnt gas passage in the intake passage. For this reason, the air for combustion is introduced from the intake passage through the intake air introducing passage to the combustion heater and at the same time the secondary air is introduced from the intake passage through the first burnt gas passage to the combustion heater.

The above-described air for combustion is introduced into the second burnt gas discharging means through the combustion chamber of the combustion heater. The above-described secondary air is caused to reversely flow through the heat exchange portion and to be introduced into the second burnt gas discharging means. Thus, if the secondary air is fed to the second burnt gas discharging means located downstream of the combustion chamber, even if the pressure difference between the joint portion of the third burnt gas passage in the exhaust passage and the joint portion of the intake air introducing passage in the intake passage is increased, the pressure difference between the upstream side and the downstream side of the combustion chamber is suppressed. As a result, the flow rate and the flow amount of the gas passing through the combustion chamber are not increased excessively and the combustion within the combustion chamber is stabilized.

Also, in the combustion heater, since the burnt gas that has been discharged from the combustion chamber is prevented from entering the heat exchange portion by the secondary air reversely flowing in the heat exchange portion, the heat of the burnt gas is not transmitted to the engine related element and the heat quantity of the burnt gas is increased.

Subsequently, the second burnt gas discharging means discharges the mixture gas of the above-described secondary gas and burnt gas. The burnt gas that has been discharged from the second gas burnt gas discharging means is fed to the exhaust passage upstream of the exhaust gas purifying catalyst through the second burnt gas passage. The mixture gas fed to the exhaust passage is introduced into the exhaust gas purifying catalyst through the exhaust passage.

In this case, since the above-described mixture gas has the heat quantity that is substantially equal to that of the burnt gas and has a lower temperature than that of the burnt gas, none of the second burnt gas discharging means, the second burnt gas passage and the burnt gas passage controlling means or the like are not excessively elevated. Furthermore, the exhaust gas purifying catalyst is elevated for a short period of time by the relatively large heat quantity possesses by the mixture gas.

The internal combustion engine with a combustion heater according to the present invention, the burnt gas passage controlling means may close the second burnt gas passage upon ignition and extinguishment of the combustion heater.

The reason for this is that, in the internal combustion engine with a combustion heater, it is expected that the pressure of the intake air supercharged by the supercharger is considerably high by the pressure of the exhaust gas, and in such a case, if the second burnt gas passage is communicated, the intake passage and the exhaust passage are in communication with each other through the combustion heater so that the amount of the intake air passing through the combustion heater is excessively increased to degrade the ignitability of the combustion heater.

On the other hand, in the internal combustion engine provided with the supercharger in the intake passage, in extinguishment, i.e., in the inoperative condition of the combustion heater, if the second burnt gas passage is communicated to thereby communicate the intake passage and the exhaust passage with each other, a part of the intake air supercharged by the supercharger is bypassed around the internal combustion engine to flow into the exhaust passage, resulting in degradation of the supercharging effect by the supercharger.

Next, an internal combustion engine with a combustion heater according to the present invention may comprise:

an exhaust gas purifying catalyst provided in an exhaust passage of the internal combustion engine for purifying harmful gaseous components contained in exhaust gas;

a combustion heater including a combustion chamber that is independent of the internal combustion engine and a heat exchange portion for transmitting to an engine related element heat held by burnt gas that has been burnt in the combustion chamber;

a first burnt gas discharging means for discharging from the combustion heater the burnt gas which has passed through the heat exchange portion;

a second burnt gas discharging means for discharging from the combustion heater the burnt gas that has not yet passed through the heat exchange portion or that has passed through a part of the heat exchange portion;

an intake air introducing passage for introducing air for combustion from an intake passage of the internal combustion engine to the combustion heater;

a first burnt gas passage for communicating the first burnt gas discharging means with a joint portion downstream of the intake air introducing passage in the intake passage;

a second burnt gas passage for communicating the second burnt gas discharging means with a joint portion downstream of the first burnt gas passage in the intake passage;

a third burnt gas passage for communicating the second burnt gas discharging means with the exhaust passage of the exhaust gas purifying catalyst; and a burnt gas passage controlling means for controlling of a flow of gas in the second burnt gas passage and the third burnt gas passage.

In this case, it is preferable that the joint portion between the intake passage and the second burnt gas passage and the joint portion between the exhaust passage and the third burnt gas passage are selected to a position where these pressures may be lower than that of the joint portion of the first burnt gas passage and that of the intake passage introducing passage in the intake passage.

Also, in the case where the supercharger is provided in the intake passage of the internal combustion engine, it is preferable to provide the intake air introducing passage downstream of the supercharger.

With such an arrangement, it is possible to selectively feed to the intake passage and the exhaust passage the gas that is high in heat quantity and lower in temperature than the burnt gas, without unstabilizing the combustion condition of the combustion chamber.

For instance, in the case where the temperature of the engine related element or the engine temperature is less than a predetermined temperature in start of the engine or the like, the burnt gas passage controlling means communicates the second burnt gas passage and at the same time closes the third burnt gas passage.

In this case, since the intake air introducing passage, the first burnt gas passage and the second burnt gas passage are in communication, applied to the combustion heater are the pressure in the vicinity of the joint portion of the intake air introducing passage in the intake passage, the pressure in the vicinity of the joint portion of the first burnt gas passage in the intake passage and the pressure in the vicinity of the joint portion of the second burnt gas passage in the intake passage.

The pressure in the vicinity of the joint portion of the second burnt gas passage in the intake passage is lower than the pressure in the vicinity of the joint portion of the intake air introducing passage in the intake passage and lower than the pressure in the vicinity of the joint portion of the first burnt gas passage in the intake passage. For this reason, the air for combustion is introduced from the intake passage through the intake air introducing passage to the combustion heater and at the same time the secondary air is introduced from the intake passage through the first burnt gas passage to the combustion heater.

The above-described air for combustion is introduced into the second burnt gas discharging means through the combustion chamber of the combustion heater. The above-described secondary air is caused to reversely flow through the heat exchange portion and to be introduced into the second burnt gas discharging means. Thus, if the secondary air is fed to the second burnt gas discharging means located downstream of the combustion chamber, even if the pressure difference between the joint portion of the second burnt gas passage and the joint portion of the intake air introducing passage in the intake passage is increased, the pressure difference between the upstream side and the downstream side of the combustion chamber is suppressed. As a result, the flow rate and the flow amount of the gas passing through the combustion chamber are not increased excessively and the combustion within the combustion chamber is stabilized.

Also, in the combustion heater, since the burnt gas that has been discharged from the combustion chamber is prevented from entering the heat exchange portion by the secondary air reversely flowing in the heat exchange portion, the heat of the burnt gas is not transmitted to the engine related element and the heat quantity of the burnt gas is increased.

Subsequently, the second burnt gas discharging means discharges the mixture gas of the above-described secondary gas and burnt gas. The burnt gas that has been discharged from the second burnt gas discharging means is fed to the intake passage through the second burnt gas passage. The mixture gas fed to the intake passage is introduced into the internal combustion engine through the intake passage.

In this case, since the above-described mixture gas has the heat quantity that is substantially equal to that of the burnt gas and has a lower temperature than that of the burnt gas, none of the second burnt gas discharging means, the second burnt gas passage and the burnt gas passage controlling means or the like are not excessively elevated. Furthermore, it is possible to keep the necessary amount of oxygen for the engine combustion by a large amount of oxygen contained in the secondary air in the mixture gas while elevating the temperature of the atmosphere within the sleeve of the internal combustion engine by the heat held by the burnt gas in the mixture gas. Thus, the startability of the engine is enhanced.

Incidentally, the internal combustion engine with a combustion heater according to the present invention may further comprise an intake throttle valve provided between a joint portion of the first burnt gas passage and a joint portion of the second burnt gas passage in the intake passage of the internal combustion engine for reducing a flow rate of intake air flowing through the intake passage in start of the internal combustion engine.

The reason for this is that, by operating the intake throttle valve at the start of the internal combustion engine, the pressure of the joint portion of the second burnt gas passage in the intake passage is lower than the pressure of the joint portion of the intake air introducing passage at the intake passage and lower than the pressure of the joint portion of the first burnt gas passage in the intake passage.

In the internal combustion engine with a combustion heater according to the present invention, the burnt gas passage controlling means closes the second burnt gas passage while communicating the third burnt gas passage when temperature elevation demand of the exhaust gas purifying catalyst occurs.

In this case, since the intake air introducing passage, the first burnt gas passage and the third burnt gas passage are in communication, applied to the combustion heater are the pressure in the vicinity of the joint portion of the intake air introducing passage in the intake passage, the pressure in the vicinity of the joint portion of the first burnt gas passage in the intake passage and the pressure in the vicinity of the joint portion of the third burnt gas passage in the exhaust passage.

The pressure in the vicinity of the joint portion of the third burnt gas passage in the exhaust passage is lower than the pressure in the vicinity of the joint portion of the intake air introducing passage in the intake passage and lower than the pressure in the vicinity of the joint portion of the first burnt gas passage in the intake passage. For this reason, the air for combustion is introduced from the intake passage through the intake air introducing passage to the combustion heater and at the same time the secondary air is introduced from the intake passage through the first burnt gas passage to the combustion heater.

The above-described air for combustion is introduced into the second burnt gas discharging means through the combustion chamber of the combustion heater. The above-described secondary air is caused to reversely flow through the heat exchange portion and to be introduced into the second burnt gas discharging means. Thus, if the secondary air is fed to the second burnt gas discharging means located downstream of the combustion chamber, even if the pressure difference between the joint portion of the third burnt gas passage and the joint portion of the intake air introducing passage in the intake passage is increased, the pressure difference between the upstream side and the downstream side of the combustion chamber is suppressed. As a result, the flow rate and the flow amount of the gas passing through the combustion chamber are not increased excessively and the combustion within the combustion chamber is stabilized.

Also, in the combustion heater, since the burnt gas that has been discharged from the combustion chamber is prevented from entering the heat exchange portion by the secondary air reversely flowing in the heat exchange portion, the heat of the burnt gas is not transmitted to the engine related element and the heat quantity of the burnt gas is increased.

Subsequently, the second burnt gas discharging means discharges the mixture gas of the above-described secondary gas and burnt gas. The burnt gas that has been discharged from the second burnt gas discharging means is fed to the exhaust passage through the third burnt gas passage. The mixture gas fed to the exhaust passage is introduced into the exhaust gas purifying catalyst through the exhaust passage.

In this case, since the above-described mixture gas has the heat quantity that is substantially equal to that of the burnt gas and has a lower temperature than that of the burnt gas, none of the second burnt gas discharging means, the third burnt gas passage and the burnt gas passage controlling means or the like are not excessively elevated. Furthermore, it is possible to elevate the exhaust gas purifying catalyst for a short period of time by the relatively large amount of heat of the mixture gas.

Incidentally, the internal combustion engine with a combustion heater according to the present invention may further comprise an intake throttle valve provided between a joint portion of the first burnt gas passage and a joint portion of the second burnt gas passage in the intake passage of the internal combustion engine for reducing a flow rate of intake air flowing through the intake passage when the temperature of the exhaust gas purifying catalyst is elevated.

The reason for this is that, in an internal combustion engine such as a diesel engine in which a combustion temperature is low in a low load operational region and an exhaust gas temperature is likely to be low, since there are cases that the exhaust purifying catalyst is cooled by the low temperature exhaust gas, it is necessary to reduce the exhaust gas amount to be discharged from the internal combustion engine so that the cooling caused by the exhaust is suppressed in order to elevate the temperature of the exhaust gas purifying catalyst.

On the other hand, the burnt gas passage controlling means may close the third burnt gas passage and may simultaneously communicate the second burnt gas passage when a temperature elevation demand of the exhaust gas catalyst provided in the exhaust passage of the internal combustion engine, occurs. Namely, in the case where the temperature of the exhaust gas purifying catalyst is to be elevated, by elevating the temperature of the intake air of the internal combustion engine, the temperature of the exhaust gas to be discharged from the internal combustion engine may be elevated, to thereby elevate the temperature of the exhaust purifying catalyst.

In this case, it is possible to reduce the amount of the air flowing through the intake passage by operating the throttle valve. The reason for this is that, since the air to be fed to the internal combustion engine through the intake passage and the mixture gas to be fed to the internal combustion engine from the combustion heater are included in the intake air to be fed to the internal combustion engine, if the amount of the air to be fed to the internal combustion engine through the intake passage is decreased, it is possible to sufficiently elevate the temperature of the intake air even with a small amount of the mixture gas and it is possible to reduce the fuel consumption rate needed for the operation of the combustion heater.

In the internal combustion engine with a combustion heater according to the present invention, the burnt gas passage controlling means may close the second burnt gas passage and the third burnt gas passage upon ignition and extinguishment of the combustion heater.

BRIEF DESCRIPTION OF THE DRAWINGS

In the accompanying drawings:

FIG. 1 is a view showing an internal combustion engine with a combustion heater in accordance with a first embodiment of the present invention;

DESCRIPTION OF PREFERRED EMBODIMENTS OF THE INVENTION

EMBODIMENT MODES OF THE INVENTION

Figure 2:
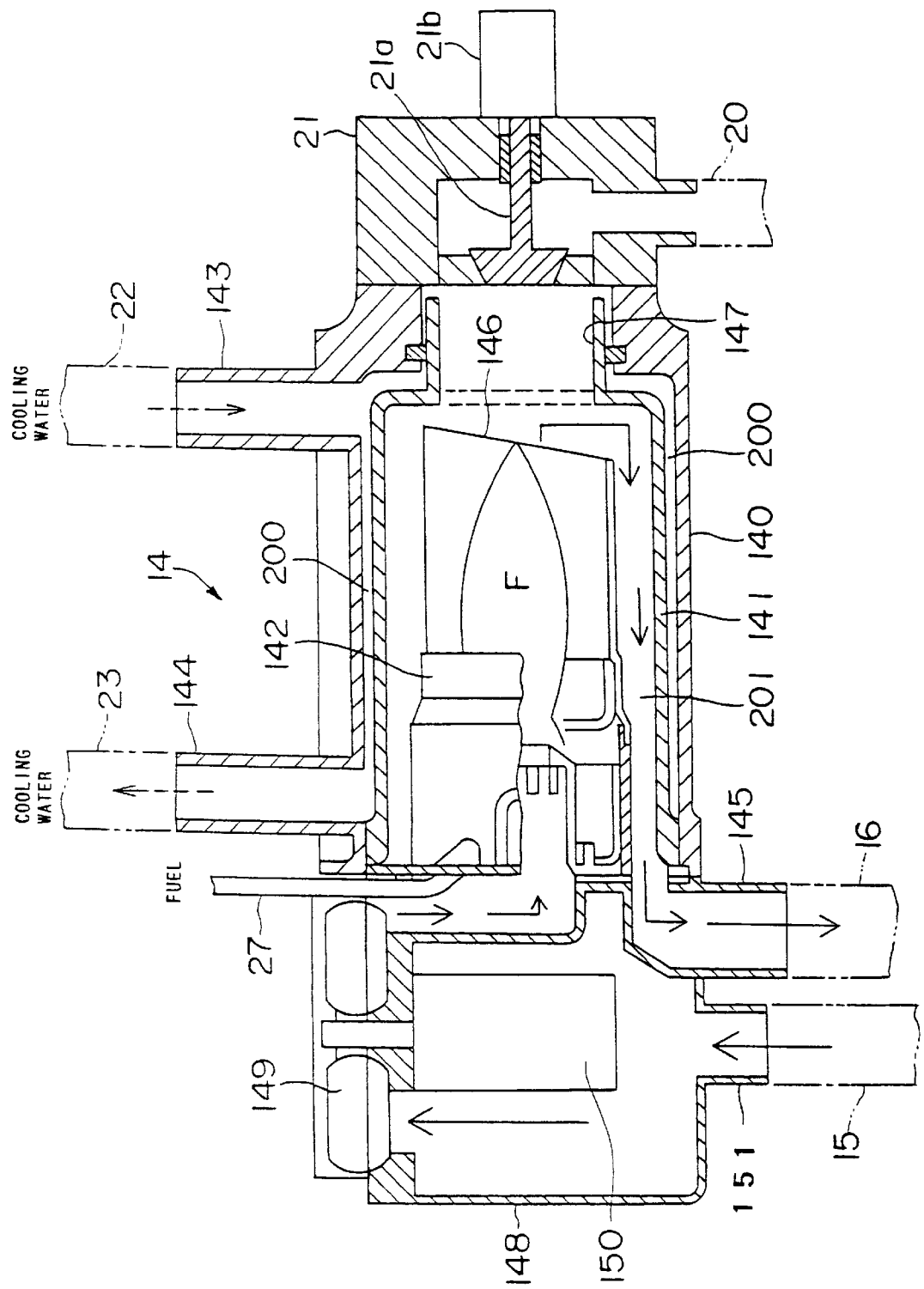
FIG. 2 is a view showing an internal structure of the combustion heater.

An embodiment modes of an internal combustion engine with a combustion heater in accordance with specific embodiments of the present invention will now be described with reference to the drawings.

Embodiment 1

FIG. 1 is a view showing a schematic structure of an internal combustion engine with a combustion heater according to the present invention.

In FIG. 1, the internal combustion engine 1 is a water-cooled sleeve interior injection type diesel engine provided with a fuel injection valve for injecting fuel directly into a combustion chamber of each cylinder.

An intake manifold 2 is connected to the internal combustion engine 1. Each branch pipe of the intake manifold 2 is in communication with the combustion chamber of each cylinder through an intake port (not shown). The above-described intake manifold 2 is connected to an intake pipe 3. The intake pipe 3 is connected to an air cleaner box 4 containing an air filter.

A compressor housing 5a of a centrifugal supercharger (turbo charger) 5 is provided in the midway of the intake pipe 3. A compressor wheel is rotatably supported within the compressor housing 5a. A rotary shaft of this compressor wheel is connected to a rotary shaft of a turbine wheel rotatably supported within a turbine housing 5b to be described later, so that the compressor wheel and the turbine wheel may be rotated together.

An inter cooler 6 is provided in the intake pipe 3 downstream of the above-described compressor housing 5a for cooling the intake air that has been compressed and kept at a high temperature in the above-described compressor housing 5a. An intake throttle valve 7 for adjusting a flow rate of the intake air within the intake pipe 3 is provided in the intake pipe 3 downstream of the above-described inter cooler 6. An actuator 8 for drivingly opening/closing the above-described intake throttle valve 7 is mounted on this intake throttle valve 7.

In the thus constructed intake system, the fresh air that has been introduced into the air cleaner box 4 has been processed through the air filter to be removed of dust or particle, and thereafter, the air is introduced into the compressor housing 5a through the intake pipe 3 to be compressed within the compressor housing 5a. The fresh air that has been compressed within the compressor housing 5a to be kept at a high temperature is to be cooled down by the inter cooler 6. The flow rate of the intake air that has been cooled down in the inter cooler 6 is adjusted by the intake throttle valve 7 as desired. Thereafter, the air is distributed to the combustion chamber of each cylinder through the intake manifold branch pipe 2 and is burnt using the fuel, injected from the fuel injection valve (not shown), as an ignition source.

On the other hand, an exhaust manifold 9 is connected to the internal combustion engine 1. Each branch pipe of this exhaust manifold 9 is in communication with the combustion chamber of each cylinder through an exhaust port (not shown). The above-described exhaust manifold branch pipe 9 is connected to an exhaust pipe 10. The exhaust pipe 10 is connected to a muffler (not shown) downstream thereof.

An exhaust gas purifying catalyst 11 for purifying harmful gas components contained in the exhaust gas is disposed in the midway of the above-described exhaust pipe 10. It is possible to exemplify a selective reduction type lean NOx catalyst, an adsorption reduction type lean NOx catalyst, a DPF carrying an oxidization catalyst or the like as this exhaust gas purifying catalyst 11.

The turbine housing 5b containing the turbine wheel rotated by the pressure of the exhaust gas is disposed in the exhaust pipe 10 upstream of the above-described exhaust gas purifying catalyst 11. An exhaust recirculation passage 12 (EGR passage) for introducing a part of the exhaust gas flowing through the exhaust pipe 10 to the intake pipe 3 downstream of the above-described intake throttle valve 7 is connected to the exhaust pipe 10 (or the exhaust manifold 9) upstream of the above-described turbine housing 5b. An EGR valve 13 for adjusting the recirculation amount of the exhaust gas is provided in the midway of the EGR passage 12.

In the thus constructed exhaust system, the mixture burnt in the combustion chamber in each cylinder is introduced through each branch pipe of the exhaust manifold 9 to the exhaust pipe 10. Subsequently, the mixture is introduced into the turbine housing 5b. The exhaust gas that has flowed into the turbine housing 5b is discharged from the turbine housing 5b after rotating the turbine wheel. The exhaust gas is caused to flow into the exhaust gas purifying catalyst 11 through the exhaust pipe 10 downstream of the turbine housing 5b. At this time, if the temperature of the bed of the exhaust gas purifying catalyst 11 is equal to or higher than the activation temperature, the harmful components contained in the exhaust gas is purified in the exhaust gas purifying catalyst 11.

Also, in the case where the EGR valve 13 is kept under the opened condition, a part of the exhaust gas flowing through the exhaust pipe 10 is introduced through the EGR passage 12 to the intake pipe 3, and is introduced into the combustion chamber of the internal combustion engine 1 while being mixed with the fresh air that has flowed from the upstream side of the intake pipe 3 to be burnt again using the fuel injected from the fuel injection valve (not shown) as the ignition source.

Subsequently, the combustion heater 14 is additionally provided in the internal combustion engine 1. As shown in FIG. 2, the combustion heater 14 is provided with an outer sleeve 140, an intermediate sleeve 141 inserted into the outer sleeve 140, and a combustion sleeve 142 inserted into the intermediate sleeve 141 for burning the fuel for the internal combustion engine 1 independently of the internal combustion engine 1.

The above-described combustion sleeve 142 is provided with a gasifying glow plug (not shown) for gasifying the fuel, and an ignition glow plug (not shown) for igniting the fuel gasified by the first-mentioned gasifying glow plug.

Incidentally, it is possible to use a single glow plug for the gasifying flow plug and the ignition glow plug.

Subsequently, a heater interior cooling water path 200 for causing the cooling water of the internal combustion engine 1 to flow is formed between the above-described outer sleeve 140 and the above-described intermediate sleeve 141. A cooling water leading port 143 for introducing the cooling water into the above-described heater interior cooling water path 200 and a cooling water discharging port 144 for discharging the cooling water within the above-described heater interior cooling water path 200 are formed in the above-described outer sleeve 140.

As shown in FIG. 1, the above-described cooling water leading port 143 is in communication with a water jacket (not shown) of the internal combustion engine 1 through a cooling water leading pipe 22, and the above-described cooling water discharging port 144 is in communication with the above-described water jacket through a cooling water discharging pipe 23.

An electric power type water pump 24 is provided in the midway of the above-described cooling water leading pipe 22 so that the cooling water that flows through the water jacket of the internal combustion engine 1 is forcibly fed into the above-described cooling water leading port 143.

The heater core 25 for the passenger room heating device is disposed in the midway of the above-described cooling water discharging pipe 23 so that the heat possessed by the cooling water flowing through the above-described cooling water discharging pipe 23 is transferred to the air for heating the room.

Subsequently, a burnt gas passage 201 for causing the burnt gas to flow the burnt gas generated in the above-described combustion sleeve 142 is formed between the above-described intermediate sleeve 141 and the combustion sleeve 142. The above-described burnt gas passage 201 is in communication with a first burnt gas discharging port 145 formed in the vicinity of the proximal end portion of the intermediate sleeve 141. The above-described first burnt gas discharging port 145 realizes a first burnt gas discharging means according to the present invention.

Here, as shown in FIG. 1, the above-described burnt gas discharging port 145 is in communication with a three-way switching valve 17 through the first burnt gas discharging passage 16. In addition to the first burnt gas discharging passage 16, an intake side discharging passage 18 and an exhaust side discharging passage 19 are connected to the above-described three-way switching valve 17.

The above-described intake side discharging passage 18 is connected to the intake pipe 3 upstream of the above-described intake throttle valve 7. The above-described exhaust side discharging passage 19 is connected to the exhaust pipe 10 located between the above-described exhaust gas purifying catalyst 11 and the above-described turbine housing 5b, preferably to the exhaust pipe 10 in the vicinity of the above-described exhaust gas purifying catalyst 11.

The above-described three-way switching valve 17 selectively closes either one of the above-described intake side discharging passage 18 and the above-described exhaust side discharging passage 19 to switch over a communication of the above-described first burnt gas discharging passage 16 and the above-described intake side discharging passage 18 (closure of the above-described exhaust side discharging passage 19) and the communication of the above-described first burnt gas discharging passage 16 and the above-described exhaust side discharging passage 19 (the closure of the above-described intake side discharging passage 18).

Also, a second burnt gas discharging port 147 is formed as a second burnt gas discharging means in accordance with the present invention at a tip end portion of the above-described intermediate sleeve 141, i.e., a portion facing the burnt gas discharging portion 146 of the above-described combustion sleeve 142. Corresponding to this, an opening/closing valve 21a for opening/closing the above-described burnt gas discharging port 147 and an actuator 21b for drivingly opening/closing this opening/closing valve 21a are mounted on the combustion heater 14.

As shown in FIG. 1, the above-described second burnt gas discharging port 147 is in communication with the above-described burnt gas discharging passage 16 through the second burnt gas discharging passage 20.

Subsequently, a fuel leading pipe 27 is connected to the combustion sleeve 142. As shown in FIG. 1, this fuel leading pipe 27 is connected to a fuel pump 26 so that the fuel injected from the above-described fuel pump 26 is fed to the above-described combustion sleeve 142 through the above-described fuel leading pipe 27.

On the other hand, a housing 148 provided with an air blower fan 149 for feeding the air for combustion into the above-described combustion sleeve 142 and a motor 150 for drivingly rotating this air blower fan 149 are mounted on the above-described outer sleeve 140.

An intake port 151 for feeding the combustion air into the housing 148 is formed in the above-described housing 148. As shown in FIG. 1, an intake air leading passage 15 is connected to the above-described intake port 151, and the above-described intake air leading passage 15 is connected to a portion downstream of the compressor housing 5a but upstream of the joint position with the above-described intake side discharging passage 18 in the above-described intake pipe 3.

In the thus constructed combustion heater 14, for example, in the case where in order to enhance the performance of the room heating device or the acceleration of the warmup of the body of the internal combustion engine 1, the temperature of the cooling water that is the engine related element is to be elevated, the valve mechanism 21 operates to close the second burnt gas discharging port 147.

Subsequently, the glow plug of the combustion sleeve 142 is subjected to current and the motor 150 operates the air blower fan 149 to feed a part of the air flowing through the intake pipe 3 to the combustion sleeve 142 of the combustion heater 14. The fuel pump 26 pumps up the fuel within the fuel tank (not shown) and feeds it to the combustion sleeve 142 of the combustion heater 14. Furthermore, the water pump 24 operates to feed the cooling water within the water jacket of the internal combustion engine 1 to the cooling water leading port 143 of the combustion heater 14 under pressure.

At this time, the mixture of the air fed by the above-described air blower fan 149 and the fuel fed by the above-described fuel pump 26 is burnt within the combustion sleeve 142.

As shown in FIG. 2, the gas burnt in the above-described combustion sleeve 142 at a high temperature is discharged from the burnt gas discharging portion 146 of the combustion sleeve 142 by the pressure of the intake air fed by the air blower fan 149 to flow to the first burnt gas discharging port 145 through the burnt gas passage 201.

On the other hand, the cooling water fed under pressure to the cooling water leading port 143 of the combustion heater 14 by the water pump 24 is introduced from the above-described cooling water leading port 143 to the heater interior cooling water path 200 and is discharged to the cooling water discharging port 144 after the passage of the heater interior cooling water passage 200.

At this time, the heat of the burnt gas flowing through the burnt gas passage 201 is transferred through the wall surface of the intermediate sleeve 141 to the cooling water flowing through the heater interior cooling water passage 200 so that the temperature of the cooling water is elevated. Thus, the heater interior cooling water passage 200 and the burnt gas passage 201 realize a heater exchanger portion according to the present invention.

The thus heated cooling water is discharged from the cooling water discharging port 144 to the cooling water discharging pipe 23 and returned into the water jacket of the internal combustion engine 1 through the heater core 25 to be recirculated through the above-described water jacket. In the above-described heater core 25, a part of the heat held by the cooling water is transmitted to the heating air so that the temperature of the heating air is elevated.

As a result, the heat of the cooling water flowing through the water jacket of the internal combustion engine 1 is transmitted to the structural elements of the internal combustion engine 1 so that, while the heating performance is enhance, the heating air is heated in the above-described heater core 25. Therefore the heating ability of the passenger room heating device is enhanced.

Subsequently, in the case where the temperature of the intake air of the internal combustion engine 1 or the exhaust gas purifying catalyst 11 has to be elevated in the earlier stage, the valve mechanism 21 is opened so that the second burnt gas discharging port 147 is brought into communication.

Subsequently, the glow plug of the combustion sleeve 142 is supplied with current and the motor 150 operates the air blow fan 149 to feed a part of the intake air flowing through the intake pipe 3 to the combustion sleeve 142 of the combustion heater 14. The fuel pump 26 pumps up the fuel within the fuel reservoir (not shown) to be fed into the combustion sleeve 142 of the combustion heater 14.

At this time, the mixture of the intake air fed by the above-described air blow fan 149 and the fuel fed by the above-described fuel pump 26 is burnt within the combustion sleeve 142.

Figure 3:
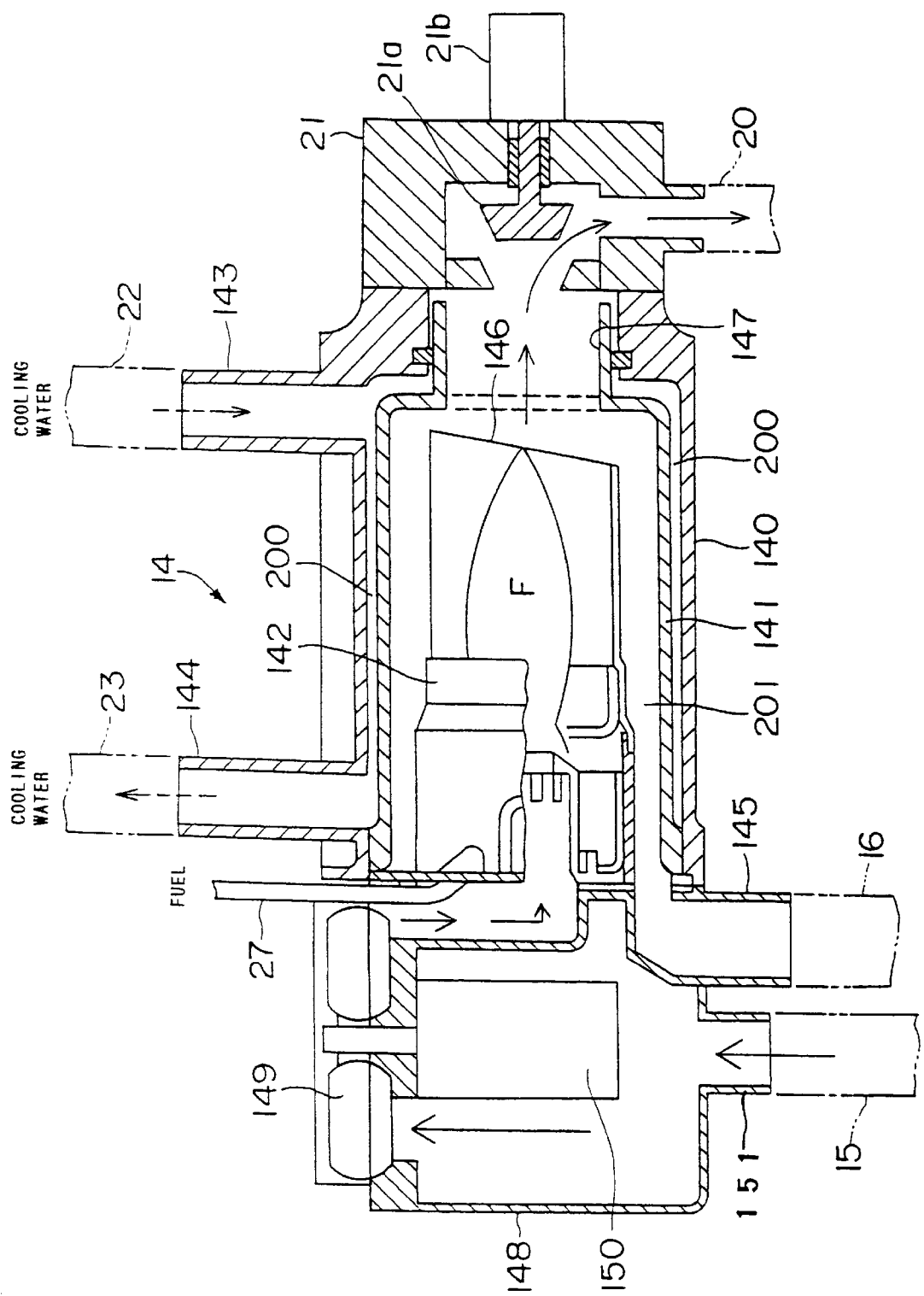
FIG. 3 is a view illustrative of the operation of the combustion heater.

As shown in FIG. 3, the high temperature burnt gas burnt within the above-described combustion sleeve 142 is discharged from a burnt gas discharging portion 146 of the combustion sleeve 142 by the pressure of the intake air fed by the air blow fan 149. Then, the major part of the burnt gas discharged from the burnt gas discharging portion 146 is discharged to the above-described second burnt gas discharging port 147 without passing through the burnt gas passage 201 (heat exchange portion).

The high temperature burnt gas discharged to the above-described second burnt gas discharging port 147 is caused to flow into the first burnt gas discharging passage 16 through the second burnt gas discharging passage 20 and is introduced into a three-way switching valve 17 through the first burnt gas discharging passage 16 and is caused to flow from the three-way switching valve 17 to the intake side discharging passage 18 or the exhaust side discharging passage 19 to be discharged to the intake pipe 3 or the exhaust pipe 10 upstream of the exhaust gas purifying catalyst 11.

Here, the heat exchange between the burnt gas discharged from the above-described second burnt gas discharging port 147 and the cooling water within the combustion heater 14 is not effected. The burnt gas becomes gas whose temperature is high in comparison with the burnt gas which has been subjected to the heat exchange with the cooling water, i.e., the burnt gas which is discharged from the first burnt gas discharging port 145.

Accordingly, the high temperature burnt gas discharged from the above-described second burnt gas discharging port 147 is fed to the intake pipe 3 or the exhaust pipe 10 upstream of the exhaust gas purifying catalyst 11 so that the intake air or the exhaust gas purifying catalyst 11 may be heated earlier.

Thus, the first burnt gas discharging passage 16, the second burnt gas discharging passage 20, the intake side discharging passage 18, the exhaust side discharging passage 19, the three-way switching valve 17 and the valve mechanism 21 realize the burnt gas passage controlling means according to the present invention.

Turning back to FIG. 1, an electronic control unit (ECU) 28 for controlling the engine is provided for the internal combustion engine 1. The ECU 28 is composed of a CPU, a ROM, a RAM, an input interface circuit, an output interface circuit and the like which are interconnected by bidirectional bus. Then, various sensors are connected through electric lines to the above-described input interface circuit. Connected to the above-described interface circuit through electric lines are the EGR valve 13, the actuator 8, the combustion heater 14 (motor 150, the glow plug of the combustion sleeve 142), the three-way switching valve 17, the valve mechanism 21, the water pump 24, the fuel pump 26 and the like.

For the sensors to be connected to the above-described input interface circuit, it is possible to exemplify an air flow meter 29 mounted on the intake pipe 3, a crank position sensor 30 and a water temperature sensor 31 mounted on the internal combustion engine 1, a catalyst temperature sensor 32 mounted on the exhaust gas purifying catalyst 11, an accelerator position sensor 33 mounted on an accelerator pedal, an accelerator lever operated in cooperation with the accelerator pedal or the like, an ignition switch 34 (IG. SW), a starter switch 35 (ST. SW) or the like.

The above-described air flow meter 29 is a sensor which outputs an electric signal corresponding to a mass of the intake air flowing through the intake pipe 3. The above-described crank position sensor 30 is a sensor which outputs a pulse signal whenever the crankshaft (not shown) of the internal combustion engine 1 rotates through a predetermined angle. The above-described water temperature sensor 31 is a sensor which output an electric signal corresponding to a temperature of the cooling water flowing through the water jacket of the internal combustion engine 1. The catalyst temperature sensor 32 is a sensor which outputs an electric signal corresponding to the catalyst bed temperature of the exhaust gas purifying catalyst 11. The accelerator position sensor 33 is a sensor which outputs an electric signal corresponding to the operational amount of the accelerator pedal.

The ECU 28 judges an operational condition of the internal combustion engine 1 on the basis of the output signal values of the various sensors described above. The ECU performs the fuel injection combustion or the like on the basis of the judgement result and at the same time controls the combustion heater control which is the subject matter of the present invention.

The combustion heater control which is to be executed by the ECU 28 will now be described.

Figure 4:
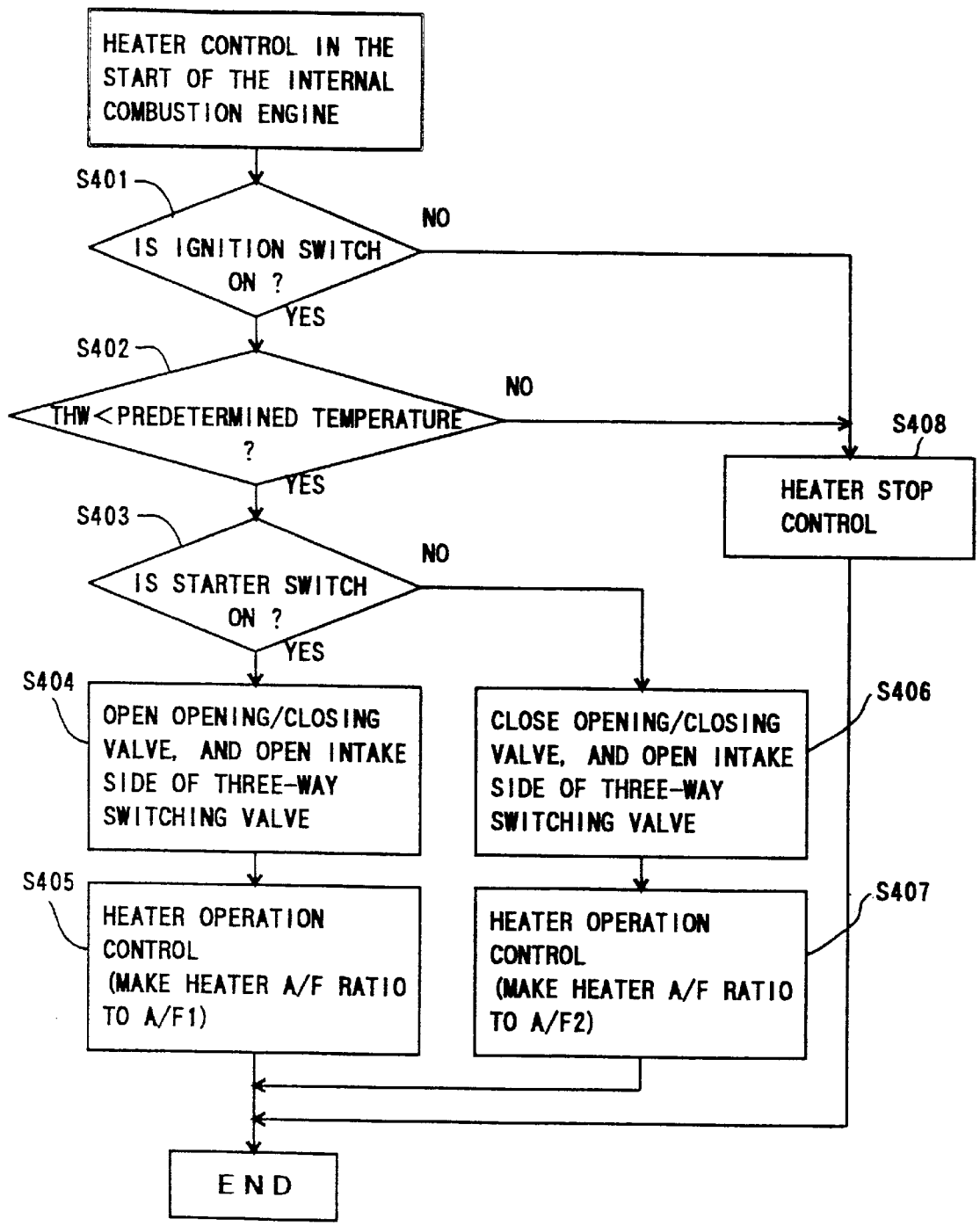
FIG. 4 is a flowchart showing a heater controlling routine at the start of the engine.

First of all, in starting the internal combustion engine 1, a starting time heater control routine is executed as shown in FIG. 4.

In the starting time heater control routine, the ECU 28 judges in a step S401 whether or not the output signal value of the ignition switch 34 is turned on.

In the case where it is judged that the output signal value (THW) of the ignition switch 34 is lower than the predetermined temperature in the above-described step S401, the ECU 28 advances to a step S402 and judges whether or not the output signal value of the water temperature sensor 31 is lower than the predetermined temperature.

In the case where it is judged that the output signal value of the water temperature sensor 31 is turned on in the above-described step S402, the ECU 28 advances to a step S403 and judges whether or not the output signal value (THW) of the starter switch 35 is turned on.

In the case where it is judged that the output signal value of the starter switch 35 is turned on in the above-described step S403, the ECU 28 regards the internal combustion engine to be under the cold staring condition and advances to a step S404.

In the step S404, the ECU 28 controls the valve mechanism 21 in order bring the second burnt gas discharging port 147 into the communication condition, and at the same time controls the three-way switching valve 17 to close the exhaust side discharging passage 19 so that the intake side discharging passage 18 and the first burnt gas discharging passage 16 are in communication with each other.

In a step S405, the ECU 28 operates the combustion heater 14 by the following steps.

The ECU 28 applies an electric drive power to the glow plug of the combustion sleeve 142 and subsequently operates the motor 150 and the fuel pump 26 to feed to the combustion sleeve 142 within the combustion heater 14 the fuel within the fuel reservoir (not shown) and a part of the intake air flowing through the intake pipe 3 so that the mixture of the above-described intake air and the above-described fuel is burnt.

At this time, the ECU 28 controls the output amount of the fuel pump 26 and the blow amount of the air blow fan 149 so that an air/fuel ratio (A/F) of the mixture to be burnt in the above-described combustion sleeve 142 becomes a leaner air/fuel ratio than that of the regular level, for example, A/F1 (=50).

Figure 5:
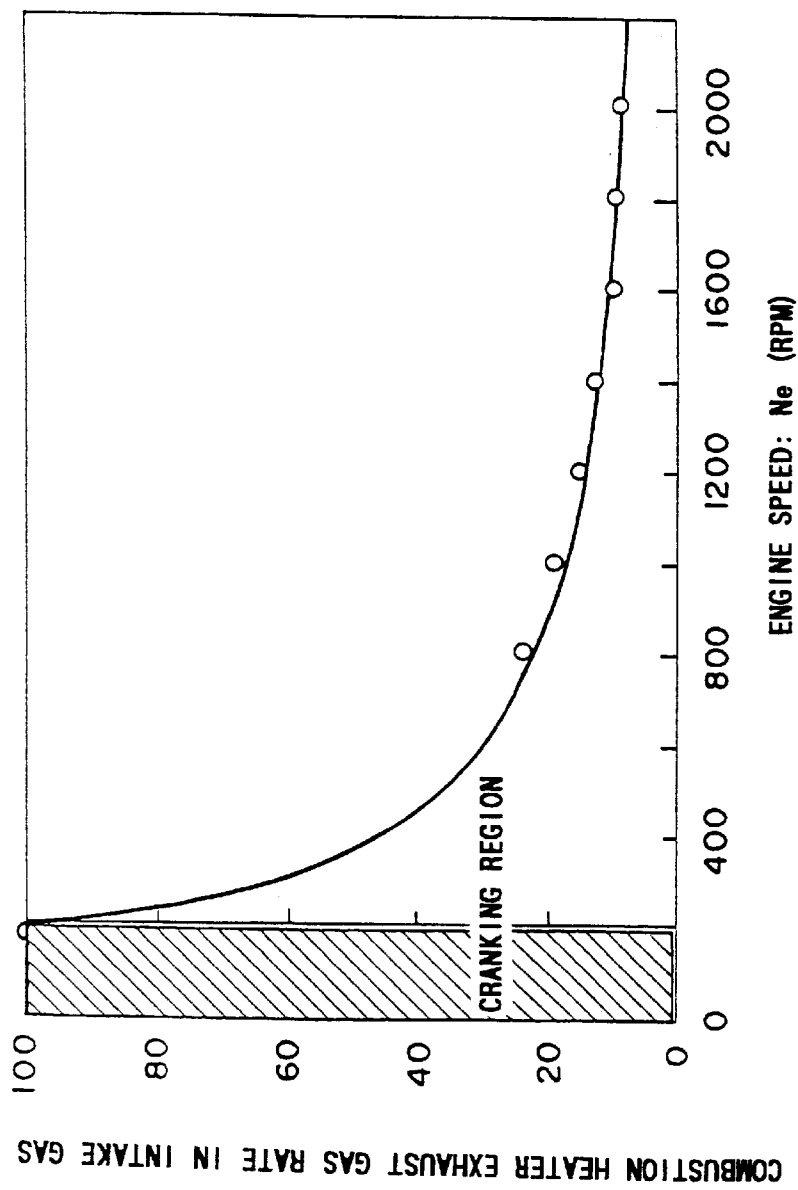
FIG. 5 is a view showing a relationship between a ratio at which the burnt gas occupies the intake air of the internal combustion engine and an engine speed.

The reason for this is that, due to the fact that, in the starting condition of the internal combustion engine 1, i.e., the cranking, as shown in FIG. 5, the engine speed (Ne) of the internal combustion engine 1 is low (for example, at 200 rpm or less) and the major part of the intake air to be fed to the combustion chamber of the internal combustion engine 1 is the burnt gas from the combustion heater 14, it is necessary to keep the residual oxygen concentration of the burnt gas at a high level in order to keep the amount of the oxygen needed for the combustion of the internal combustion engine 1.

In this case, as shown in FIG. 3, the burnt gas burnt within the combustion sleeve 142 of the combustion heater 14 is discharged to the above-described second burnt gas discharging port 147 by the pressure of the intake air fed by the air blow fan 149.

The high temperature burnt gas that has been discharged to the above-described second burnt gas discharging port 147 is caused to flow into the first burnt gas discharging passage 16 through the second burnt gas discharging passage 20 and introduced into the three-way switching valve 17 through the first burnt gas discharging passage 16.

Since the above-described three-way switching valve 17 is kept under the condition to close the exhaust side discharging passage 19, the burnt gas that has been introduced into the three-way switching valve 17 is caused to flow into the intake side discharging passage 18 and to be discharged to the intake pipe 3 through the intake side discharging passage 18.

Thus, the burnt gas that has been discharged into the intake pipe 3 is fed to the combustion chamber of the internal combustion engine 1 through the intake manifold 2 to form the mixture with the fuel injected from the fuel injection valve (not shown).

Figure 6:
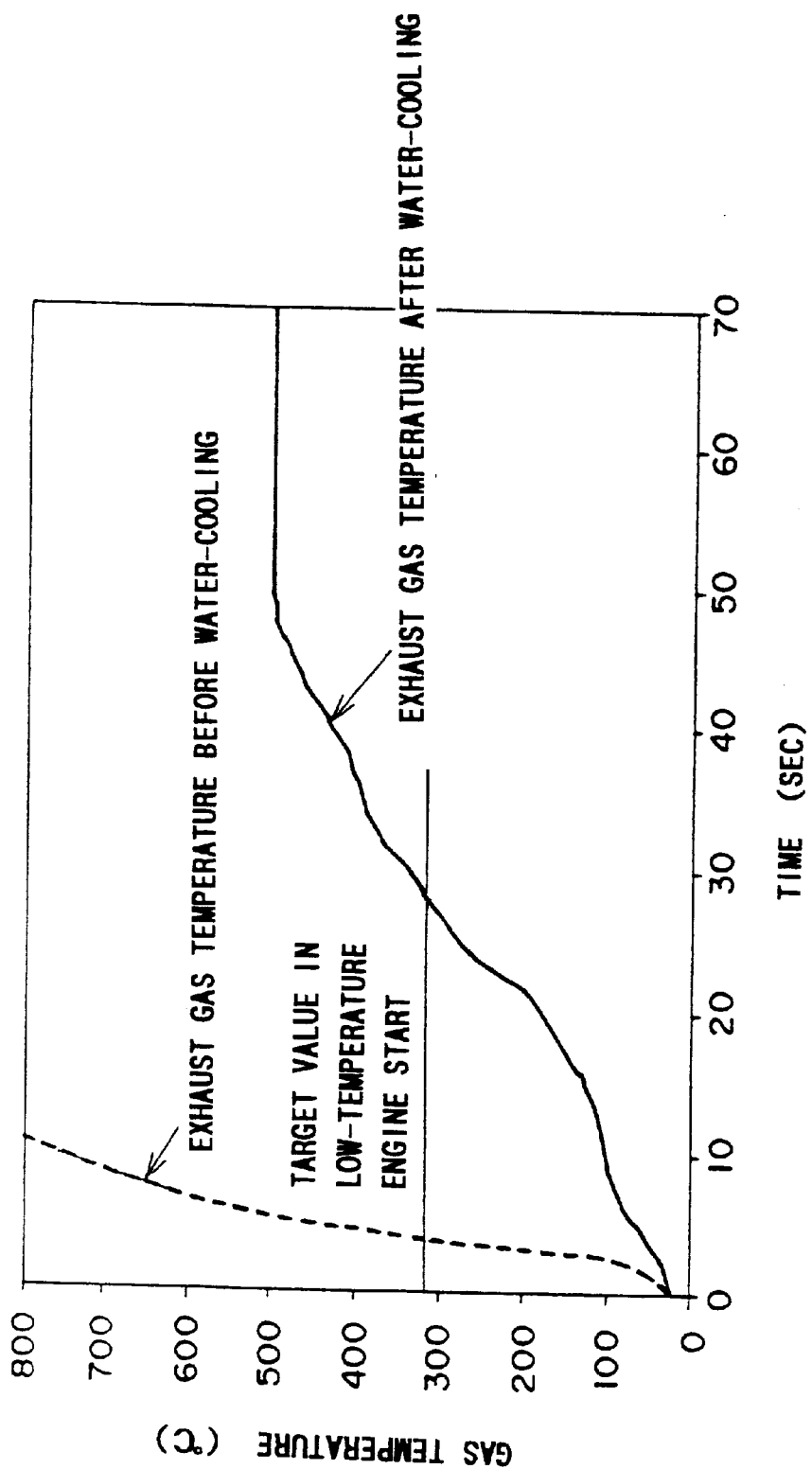
FIG. 6 is a view showing temperature characteristics between the burnt gas used in heat exchange in the combustion heater and the burnt gas not used in heat exchange.

At this time, as shown in FIG. 6, since the high temperature burnt gas relative to the burnt gas subjected to the heat exchange with the cooling water in the combustion heater 14, i.e., the high temperature burnt gas immediately after the combustion is fed, the temperature of the atmosphere within the combustion chamber is high to accelerate the gasification of the fuel. It is therefore possible to enhance the ignition property of the mixture and the startability of the internal combustion engine 1.

On the other hand, in the case where it is judged in the above-described step S403 that the output signal value of the starter switch 35 is turned off, ECU 28 regards the start of the internal combustion engine 1 as the completion and goes to a step S406.

In the step S406, the ECU 28 controls the valve mechanism 21 in order bring the second burnt gas discharging port 147 into the closed condition, and at the same time controls the three-way switching valve 17 to close the exhaust side discharging passage 19 so that the intake side discharging passage 18 and the first burnt gas discharging passage 16 are in communication with each other.

Subsequently, in a step S407, the ECU 28 operates the combustion heater 14 by the following steps.

The ECU 28 applies an electric drive power to the glow plug of the combustion sleeve 142 and subsequently operates the motor 150 and the fuel pump 26 to feed to the combustion sleeve 142 within the combustion heater 14 the fuel within the fuel reservoir (not shown) and a part of the intake air flowing through the intake pipe 3 so that the mixture of the above-described intake air and the above-described fuel is burnt. At the same time, the water pump 24 is operated to feed to the cooling water introducing port 143 of the combustion heater 14 the cooling water flowing through the water jacket of the internal combustion engine 1.

At this time, the ECU 28 controls the output amount of the fuel pump 26 and the blow amount of the air blow fan 149 so that an air/fuel ratio (A/F) of the mixture to be burnt in the above-described combustion sleeve 142 becomes the regular A/F ratio (<A/F1).

In this case, as shown in FIG. 2, the burnt gas burnt within the combustion sleeve 142 of the combustion heater 14 is introduced into the burnt gas passage 201 by the pressure of the intake air fed by the air blow fan 149 and is discharged from the first burnt gas discharging port 145.

The burnt gas discharged to the above-described first burnt gas discharging port 145 is introduced into the three-way switching valve 17 through the first burnt gas discharging passage 16. Since the above-described three-way switching valve 17 is under the condition to close the exhaust side discharging passage 19, the burnt gas introduced into the three-way switching valve 17 is caused to flow into the intake side discharging passage 18 and discharged to the intake pipe 3 through the intake side discharging passage 18.

The burnt gas discharged into the above-described intake pipe 3 is fed into the combustion chamber of the internal combustion engine 1 through the intake manifold 2 to form the mixture with the fuel injected from the fuel injection valve to be burnt.

At this time, the burnt gas whose temperature is lowered after the heat exchange with the cooling water in the combustion heater 14 is fed into the combustion chamber of the internal combustion engine 1.

Accordingly, the heat damage of the internal combustion engine 1 due to the introduction of the high temperature intake air for a long period of time may be prevented. Furthermore, the air/fuel ratio is lower than that when the internal combustion engine 1 is started. It is also possible to reduce the amount of NOx generated in the engine combustion by feeding to the combustion chamber the burnt gas whose $CO_2$ concentration is relatively high.

Also, the cooling water that has been fed to the cooling water introducing port 143 of the combustion heater 14 is discharged to the cooling water discharging port 144 after passing through the heater interior cooling water passage 200. The cooling water is subjected to the heat of the burnt gas flowing through the burnt gas passage 201 to be heated during passage through the heater interior cooling water passage 200. The heated cooling water is discharged from the cooling water discharging 144 to the cooling water discharging pipe 23 and returned to the water jacket of the internal combustion engine 1 through the heater core 25.

In this case, since the heated cooling water is caused to flow through the water jacket of the internal combustion engine 1, the heat of the cooling water is transmitted to the structural elements of the internal combustion engine 1 to accelerate the heating of the internal combustion engine 1.

Figure 7:
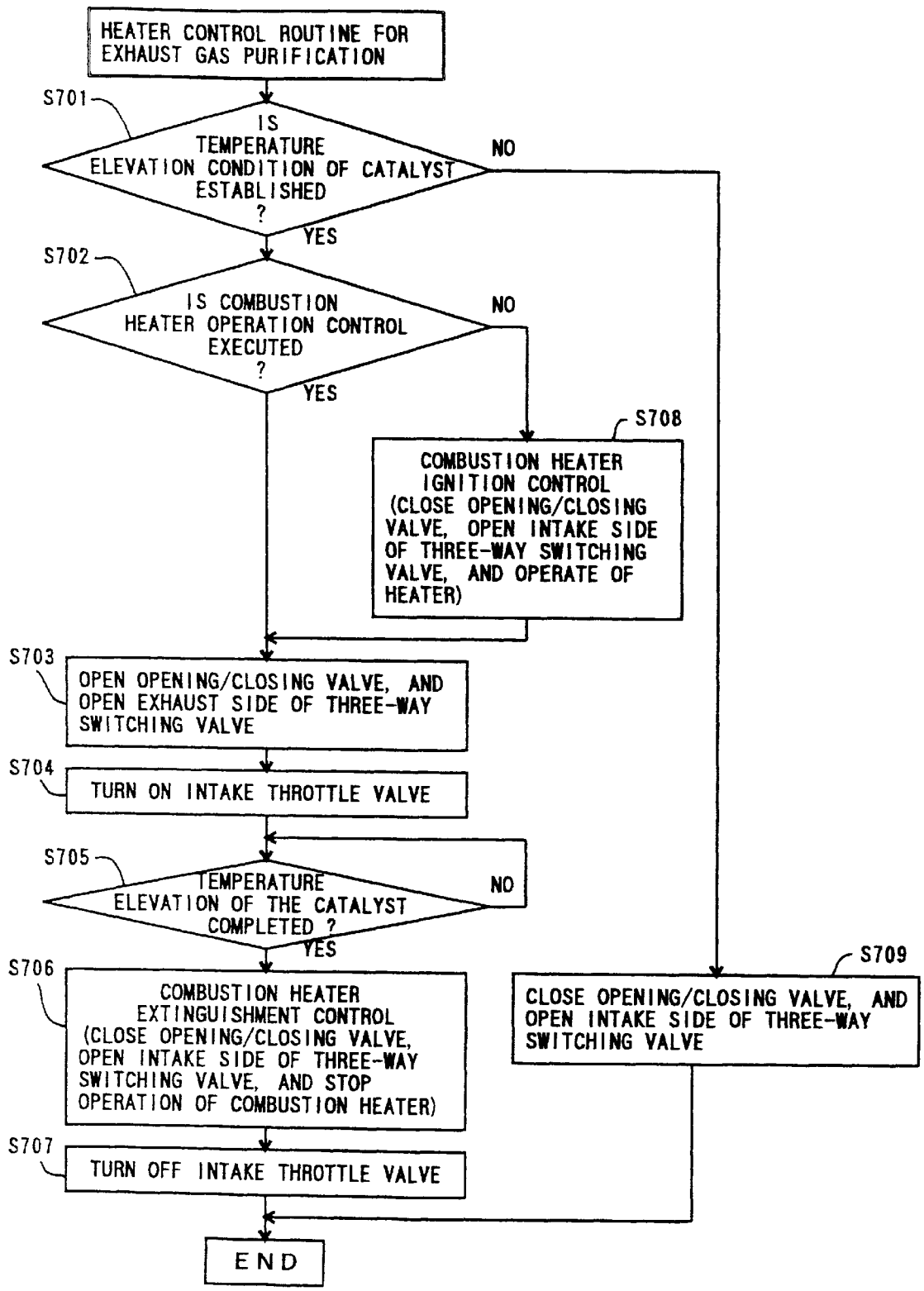
FIG. 7 is a flowchart showing a heater controlling routine for exhaust gas purification.

Subsequently, an exhaust gas purifying heater controlling routine is performed in the operation of the internal combustion engine 1 as shown in FIG. 7. This exhaust gas purifying heater controlling routine is repeatedly performed for every predetermined period (for example, whenever the crank position sensor 30 outputs the pulse signal).

In the exhaust gas purifying heater controlling routine, in a step S701, the ECU 28 judges whether or not the temperature elevation condition of the exhaust gas purifying catalyst 11 is established. For the above-described temperature elevation condition, it is possible to exemplify, for example, the fact that the output signal value of the catalyst temperature sensor 32 (catalyst bed temperature of the exhaust gas purifying catalyst 11) is less than activation temperature, in a SOx toxicity recovery process executing period of the exhaust gas purifying catalyst 11, or in an NOx reduction processing executing period in the case where the exhaust gas purifying catalyst 11 is an adsorption reduction lean NOx catalyst.

In the case where it is judged in the above-described step S701 that the temperature elevation condition of the exhaust gas purifying catalyst 11 is not established, the ECU 28 goes to a step S709 to control the valve mechanism 21 so as to close the second burnt gas discharging port 147, and at the same time controls the three-way switching valve 17 so as to close the exhaust side discharging passage 19 and to open the intake side discharging passage 18 to thereby once end the execution of this routine.

On the other hand, in the case where it is judged in the above-described step S701 that the temperature elevation condition of the exhaust gas purifying catalyst 11 is established, the ECU 28 goes to a step S702 to judge whether or not the operational control of the combustion heater 14 is executed, i.e., whether or not the combustion heater 14 is kept under the operational condition.

In the case where it is judged in the above-described step S702 that the combustion heater 14 is kept under the inoperative condition, the ECU 28 goes to a step S708 to execute the ignition control of the combustion heater 14. The ECU 28 controls the valve mechanism 21 so as to close the second burnt gas discharging port 147, and at the same time to control the three-way switching valve 17 to close the exhaust side discharging passage 19 and open the intake side discharging passage 18. Thereafter, the electric drive power is fed to the glow plug of the combustion sleeve 142, the motor 150 and the fuel pump 26 to operate the combustion heater 14.

Here, the reason why the exhaust side discharging passage 19 is closed and the intake side discharging passage 18 is opened by the three-way switching valve 17 upon the ignition of the combustion heater 14 is that, since the intake air introduction passage 15 is connected to the intake pipe 3 downstream of the compressor housing 5a and the exhaust side discharging passage 19 is connected to the exhaust pipe 10 downstream of the turbine housing 5b, if the exhaust side discharging passage 19 is opened and the intake side discharging passage 18 is closed by the three-way switching valve 17, the difference between the intake air pressure fed downstream of the compressor housing 5a and the exhaust gas pressure downstream of the turbine housing 5b becomes large (intake gas pressure>exhaust gas pressure), and the amount of the intake air passing through the combustion heater 14 is increased, resulting in the degradation of the ignitability of the combustion sleeve 142.

On the other hand, the reason why the second burnt gas discharging port 147 is closed by the valve mechanism 21 upon the ignition of the combustion heater 14 is that the heat damage of the intake system parts caused by the entrainment, into the intake pipe 3, of the high temperature burnt gas which has not been subjected to the heat exchange with the cooling water.

In the case where the process of the above-described step S708 has been executed, or in the case where it is judged in the above-described step S702 that the combustion heater 14 is kept under the operative condition, the ECU 28 goes to a step S703 to control the valve mechanism 21 so as to keep the second burnt gas discharging port 147 under the communication condition, and at the same time, to control the three-way switching valve 17 so as to close the intake side discharging passage 18 and open the exhaust side discharging passage 19.

Subsequently, in a step S704, the ECU 28 controls the actuator 8 to operate the intake throttle valve 7 to reduce the flow rate of the intake air of the intake pipe 3.

In this case, the burnt gas burnt in the combustion sleeve 142 of the combustion heater 14 is discharged from the second burnt gas discharging port 147 to the second burnt gas discharging passage 20 and is subsequently fed to the exhaust pipe 10 upstream of the exhaust gas purifying catalyst 11 through the second burnt gas discharging passage 20, the first burnt gas discharging passage 16, the three-way switching valve 17 and the exhaust side discharging passage 19. The burnt gas fed to the above-described exhaust pipe 10 is introduced into the exhaust gas purifying catalyst 11 while being mixed with the exhaust gas flowing from the upstream side of the exhaust pipe 10.

As a result, the high temperature burnt gas that has not been subjected to the heat exchange with the cooling water is flown into the exhaust gas purifying catalyst 11, and the exhaust gas purifying catalyst 11 may be heated for a short period of time.

Also, the exhaust gas purifying catalyst 11 is heated by the burnt gas from the combustion heater 14 while it is cooled by the exhaust gas kept at a low temperature (particularly, the exhaust gas in the low load operation) from the internal combustion engine 1. In this embodiment, the intake throttle valve 7 is operated to reduce the amount of the intake air of the internal combustion engine 1 so that the temperature drop of the exhaust gas purifying catalyst 11 by the exhaust gas of the internal combustion engine 1 may be suppressed as much as possible and the temperature elevation rate of the exhaust gas purifying catalyst 11 may be further enhanced.

Furthermore, since the difference between the intake air pressure fed downstream of the compressor housing 5a and the exhaust gas pressure downstream of the turbine housing 5b becomes large (intake gas pressure>exhaust gas pressure) if the supercharged pressure of the intake air by the centrifugal supercharger 5 is high when the burnt gas of the combustion heater 14 is fed to the exhaust pipe 10, the flow rate of the intake air passing through the combustion heater 14 would be excessively increased to induce the generation of lean misfire. However, it is possible to decrease the supercharged pressure of the intake air by the centrifugal supercharger 5 by operating the intake throttle valve 7 to decrease the flow rate of the exhaust gas of the internal combustion engine 1 (the flow rate of the exhaust gas relating to the operation of the supercharger 5). An excessive intake air is prevented from entering the combustion heater 14 to thereby prevent the lean misfire of the combustion heater 14.

The ECU 28 that has completed the process of the above-described step S704 goes to a step S705 and judges whether or not the temperature elevation of the exhaust gas purifying catalyst 11 has been completed (that is; whether or not the output signal value of the catalyst temperature sensor 32 reaches a predetermined temperature or more, whether or not the SOx toxicity process has been completed, or whether or not the NOx reduction process has been completed, or the like).

In the case where it is judged in the above-described step S705 that the temperature elevation of the exhaust gas purifying catalyst 11 has not been completed, the process of step S705 will be repeated until the temperature elevation of the exhaust gas purifying catalyst 11 has been completed.

In the case where the ECU 28 judges in the above-described step S705 that the temperature elevation of the exhaust gas purifying catalyst 11 has been completed, the ECU 28 goes to a step S706 to perform the extinguishment control of the combustion heater 14. More specifically, the ECU controls the valve mechanism 21 to close the second burnt gas discharging port 147, controls the three-way switching valve 17 to close the exhaust side discharging passage 19 and to open the intake side discharging passage 18, and thereafter stop the drive power supply to the motor 150, the fuel pump 26 and the combustion sleeve 142.

The reason why the exhaust side discharging passage 19 is closed and the intake side discharging passage 18 is opened by the three-way switching valve 17 upon the extinguishment of the combustion heater 14 is that if the exhaust side discharging passage 19 is opened and the intake side discharging passage 18 is closed by the three-way switching valve 17 when the combustion heater 14 is kept under the extinguishment condition (under the inoperative condition), the supercharged intake air downstream of the compressor housing 5a is caused to flow to the discharging pipe 10 downstream of the turbine housing 5b by bypassing the internal combustion engine 1, resulting in the degradation in the supercharging effect by the centrifugal supercharger 5.

The ECU 28 that has completed the process of the above-described step S706 goes to a step S707 and controls the actuator 8 to stop the operation of the intake throttle valve 7 to complete the execution of the present routine.

According to the above-described embodiment, since it is possible to feed into the intake system of the internal combustion engine 1 the burnt gas that is kept at a high temperature in the lean atmosphere without any heat exchange with the cooling water in the combustion heater 14, in the cold start of the internal combustion engine 1, the atmospheric temperature within the combustion chamber of the internal combustion engine 1 becomes higher to make it possible to enhance the startability of the internal combustion engine 1 and the ignitability of the gas mixture. At this time, since the intake air introduction path and the burnt gas discharging path of the combustion h eater 14 are provided at positions close to the intake pipe 3 downstream of the supercharger (compressor housing 5a), there is no fear that the burnt gas would flow reversely.

Furthermore, in the case where it is necessary to elevate the temperature of the exhaust gas purifying catalyst 11, since the high temperature burnt gas which has not been subjected to heat exchange with the cooling water in the combustion heater 14 may be fed into the exhaust gas purifying catalyst 11, it is possible to elevate the temperature of the exhaust gas purifying catalyst 11 up to a desired temperature in the earlier stage and to enhance the exhaust gas emission.

In this case, since the amount of the exhaust gas flowing from the internal combustion engine 1 to the exhaust gas purifying catalyst 11 is decreased by the operation of the intake throttle valve 7 so that the temperature drop of the exhaust gas purifying catalyst 11 by the low temperature exhaust gas as in the low load operation may be suppressed, it is possible to further enhance the temperature elevation rate by the burnt gas of the combustion heater 14.

Also, upon the ignition of the combustion heater 14, the intake introduction path and the burnt gas discharging path of the combustion heater 14 are switched over to the positions in the vicinity of the intake pipe 3 downstream of the supercharger (compressor housing 5a) so that the degradation of the ignitability may be prevented without the phenomenon that the excessive intake air passes through the combustion heater 14.

Furthermore, upon the ignition of the combustion heater 14, the discharge of the burnt gas that has not been subjected to heat exchange with the cooling water in the combustion heater 14 is prevented so that the high temperature burnt gas is not fed to the intake system of the internal combustion engine 1 and the thermal damage of the intake system may be prevented.

Incidentally, in the foregoing embodiment, in the case where the temperature of the exhaust gas purifying catalyst 11 is elevated, an example in which the high temperature burnt gas that has not been subjected to heat exchange with the cooling water in the combustion heater 14 is directly fed to the exhaust gas purifying catalyst 11 has been described. However, it is possible to open the valve mechanism 21 to a predetermined opening degree and simultaneously open the intake side discharge passage 18 by the three-way switching valve 17 to introduce into the intake pipe 3 the mixture of the burnt gas that has been subjected to heat exchange with the cooling water and the burnt gas that has not been subjected to heat exchange with the cooling water in the combustion heater 14 to enhance the intake air temperature of the internal combustion engine 1 while preventing the thermal damage of the intake system, thereby elevating the temperature of the sleeve in the initial stage of the compression stroke to elevate the temperature of the combustion in the sleeve, as a result of which the temperature of the exhaust gas of the internal combustion engine 1 may be elevated.

If the system is thus controlled, in the internal combustion engine with a low pressure ratio, it is possible to expect the effect of reduction in HC amount contained in the exhaust gas by stabilizing the combustion in the low load operation in addition to the temperature elevation effect of the exhaust gas purifying catalyst by the exhaust gas temperature elevation.

Also, in parallel with the above-described control, the intake throttle valve 7 is operated to reduce the amount of the intake air of the internal combustion engine 1 so that the intake air temperature may be elevated while reducing the amount of the burnt gas to be discharged from the combustion heater 14 and the degradation in the fuel consumption rate relating to the operation of the combustion heater 14 may be suppressed.

Figure 8:
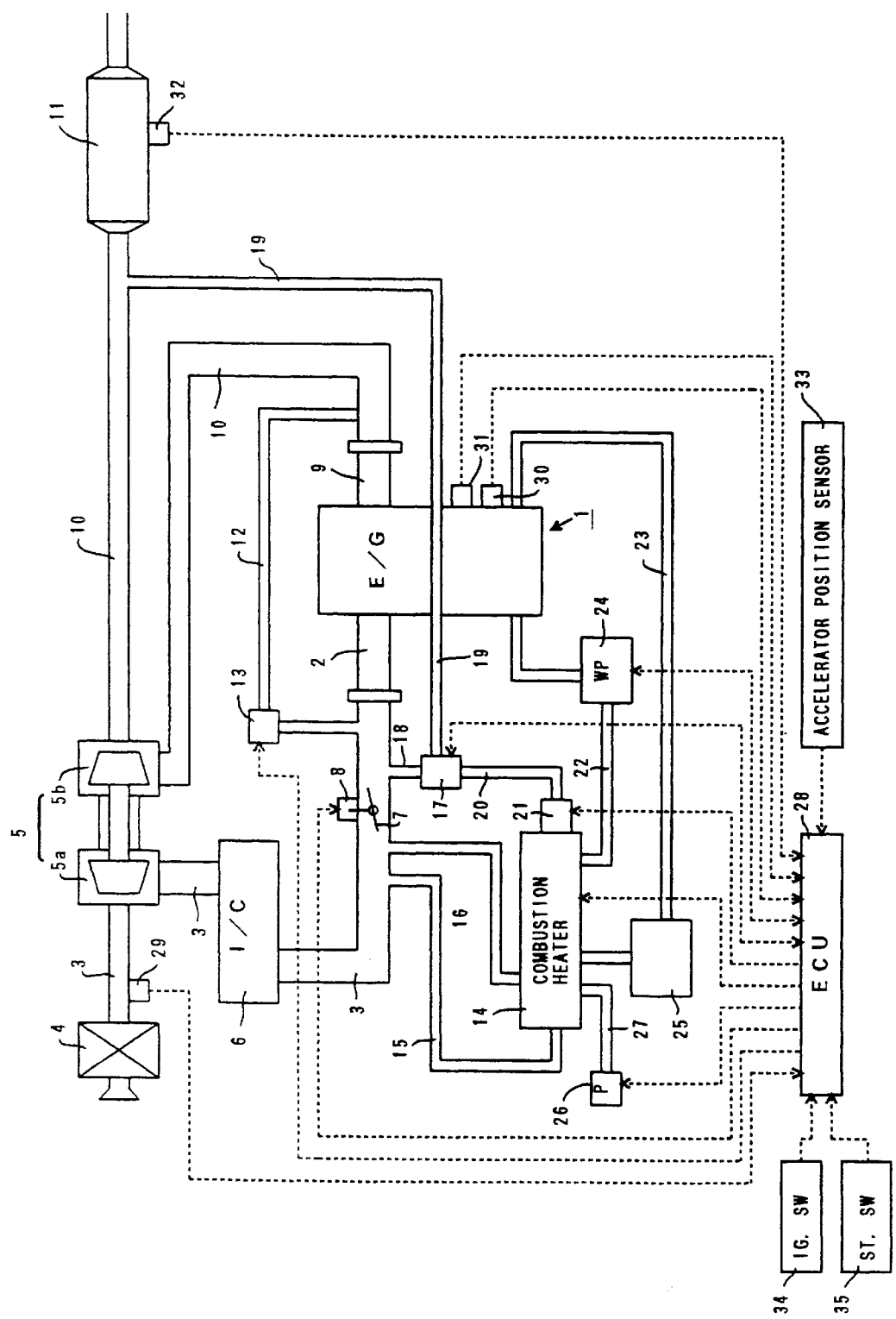
FIG. 8 is a view showing an internal combustion engine with a combustion heater in accordance with another embodiment of the present invention.

On the other hand, in the foregoing embodiment, a structural example in which the first burnt gas discharging passage 16 is connected to the three-way switching valve 17 and the second burnt gas discharging passage 20 is connected in the midway of the first burnt gas discharging passage 16 has been described. However, as shown in FIG. 8, it is possible to adapt the following modification. Namely, the first burnt gas discharging passage 16 is connected directly to the portion downstream of the joint portion with the intake air introducing passage 15 in the intake pipe 3 and upstream of the joint portion with the intake side discharging passage 18, whereas the second burnt gas discharging passage 20 is connected to the three-way switching valve 17 and the intake side discharging passage 18 is further connected downstream of the intake throttle valve 7 in the intake pipe 3.

In this case, in the case where the high temperature burnt gas that has not been subjected to heat exchange in the combustion heater 14 is fed to the intake pipe 3, the high temperature burnt gas discharged from the second burnt gas discharging port 147 of the combustion heater 14 is fed to the intake pipe 3 downstream of the intake throttle valve 7 through the second burnt gas discharging passage 20, the three-way switching valve 17 and the intake side discharging passage 18. Accordingly, there is no fear that the intake throttle valve 7 is exposed to the high temperature burnt gas and it is possible to prevent the thermal damage of the intake throttle valve 7.

Also, in the case where the high temperature burnt gas that has not been subjected to heat exchange in the combustion heater 14 is fed into the exhaust gas purifying catalyst 11, it is possible to readily adjust the feed amount of the burnt gas by controlling the valve mechanism 21.

Embodiment 2

An internal combustion engine with a combustion heater in accordance with a second embodiment of the present invention will now be described with reference to the drawings. In this case, the structure that is different from that of the above-described first embodiment will now be described and the explanation of the similar structure will be omitted.

Figure 9:
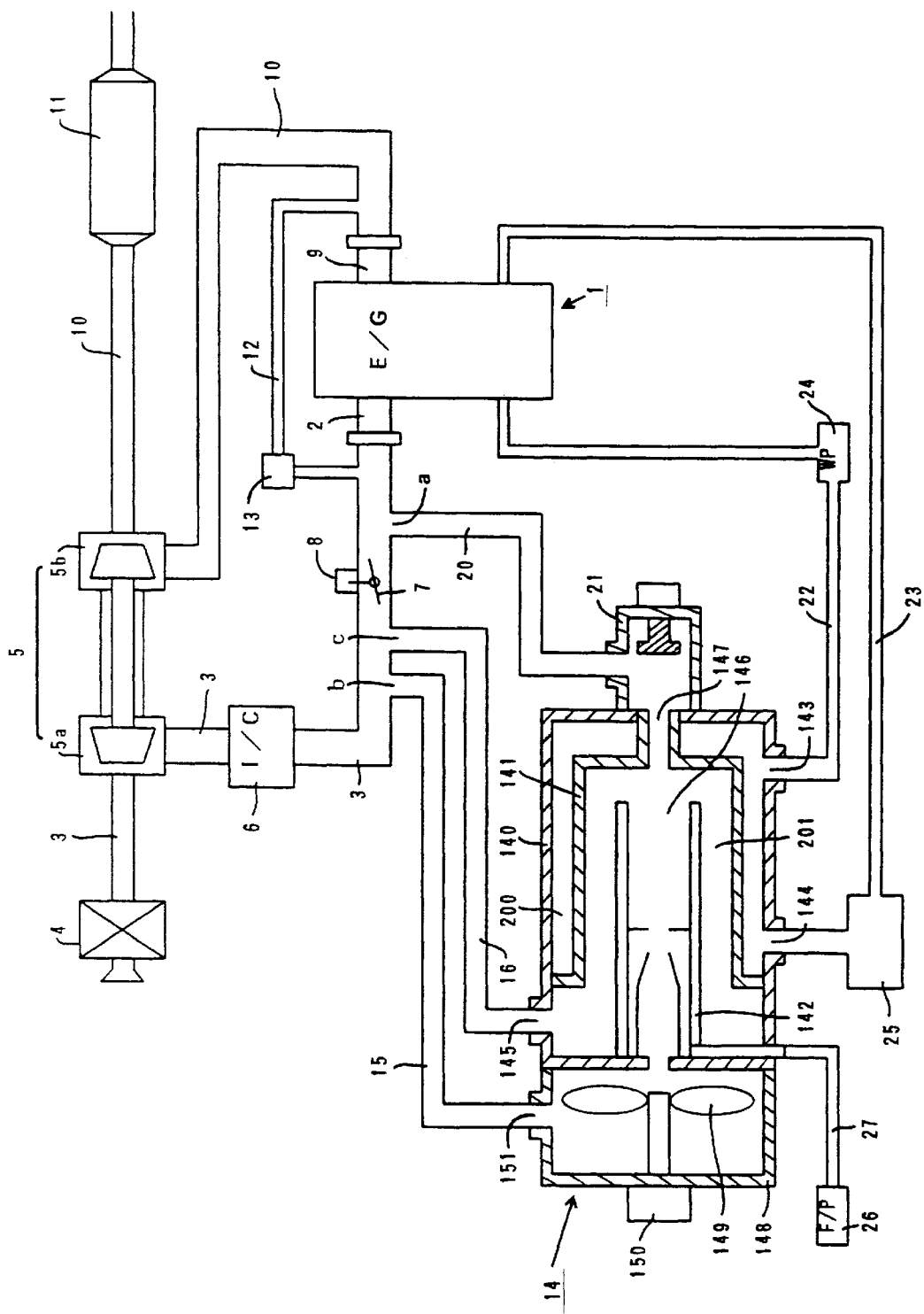
FIG. 9 is a view showing an internal combustion engine with a combustion heater in accordance with a second embodiment of the present invention.

FIG. 9 is a schematic view of the internal combustion engine with the combustion heater in accordance with the embodiment.

In this embodiment, the first burnt gas discharging port 145 of the combustion heater 14 is in direct communication with a portion upstream of the intake throttle valve 7 and downstream of the intake air introducing passage 15 in the intake pipe 3 through the first burnt gas discharging passage 16.

The second burnt gas discharging port 147 of the combustion heater 14 is in communication with a portion downstream of the intake throttle valve 7 in the intake pipe 3 through the valve mechanism 21 and the second burnt gas discharging passage 20.

In the thus constructed internal combustion engine with the combustion heater, for instance, in order to enhance the performance of the passenger room heating device and the acceleration of the heating of the body of the internal combustion engine 1, in the case where the temperature of the cooling water that is the engine related element is to be elevated, the valve mechanism 21 is closed to close the second burnt gas discharging port 147.

In this case, the high temperature burnt gas which has been burnt within the above-described combustion sleeve 142 is discharged from the burnt gas discharging portion 146 of the combustion sleeve 142 by the pressure of the intake air fed out by the air blow fan 149 and caused to flow to the first burnt gas discharging port 145 through the burnt gas passage 201.

On the other hand, the cooling water that has been fed under pressure to the cooling water introducing port 143 of the combustion heater 14 by the water pump 24 is introduced from the above-described cooling water introducing port 143 to the heater interior cooling water passage 200 to pass the heater interior cooling water passage 200 to be discharged to the cooling water discharging port 144.

In this case, the heat of the burnt gas flowing through the burnt gas passage 201 is transmitted through the wall surface of the intermediate sleeve 141 to the cooling water flowing through the heater interior cooling water passage 200 so that the temperature of the cooling water is elevated.

The thus heated cooling water is discharged from the cooling water discharging port 144 to the cooling water discharging pipe 23 and returned back to the water jacket of the internal combustion engine 1 through the heater core 25 to recirculate within the above-described water jacket. In the above-described heater core 25, a part of the heat held by the cooling water is transmitted to the heating air so that the temperature of the heating air is elevated.

As a result, the heat of the cooling water flowing through the water jacket of the internal combustion engine 1 is transmitted to the structural element of the internal combustion engine 1 so that the heating ability of the internal combustion engine 1 per se is enhanced, and at the same time, the heating air is heated in the above-described heater core 25. Therefore the heating ability of the passenger room heating device is enhanced.

Subsequently, in the case where the temperature of the intake air of the internal combustion engine 1 has to be elevated, the valve mechanism 21 is opened so that the second burnt gas discharging port 147 is opened. The actuator 8 drives the intake throttle valve 7 in the valve opening direction to a predetermined opening degree as desired.

In this case, since the joint portion (indicated by a in FIG. 9) of the second burnt gas discharging passage 20 in the intake pipe 3 is kept at a lower pressure than that of the joint portion (indicated by b in FIG. 9) of the intake air introducing passage 15 in the intake pipe 3 and that of the joint portion (indicated by c in FIG. 9) of the first burnt gas discharging passage 16 in the intake pipe 3, the intake air is introduced from the intake air introducing passage 15 into the combustion heater 14 and at the sam time, the intake air is also introduced from the first burnt gas discharging passage 16 into the combustion heater 14.

The intake air that has been introduced into the combustion heater 14 through the above-described intake air introducing passage 15 is entrained into the housing 148 through the intake port 151, and subsequently introduced into the combustion sleeve 142 by the air blower fun 149 to be burnt together with the fuel in the combustion sleeve 142. The high temperature gas that has been burnt in the combustion sleeve 142 is discharged from the burnt gas discharging portion 146 of the combustion sleeve 142 to reach the second burnt gas discharging port 147.

On the other hand, the intake air that flows reversely through the above-described first burnt gas discharging passage 16 to be introduced into the combustion heater 14 is led to the burnt gas passage 201 through the first burnt gas discharging port 145 to flow reversely through the burnt gas passage 201 to reach the second burnt gas discharging port 147.

The burnt gas through the above-described combustion sleeve 142 and the intake air through the burnt gas passage 201 are discharged to the second burnt gas discharging passage 20 while being mixed with each other in the vicinity of the second burnt gas discharging port 147. The gas discharged to the second burnt gas discharging passage 20 is introduced to the intake pipe 3 downstream of the intake throttle valve 7, fed to the combustion chamber of the internal combustion engine 1 together with the intake air flowing from the upstream side of the intake throttle valve 3 and burnt together with the fuel injected from the fuel injection valve.

Here, it should be noted that, since the intake air through the first burnt gas discharging passage 16 and the burnt gas passage 201 is fed to the second burnt gas discharging port 147, even if the pressure difference between the joint portion b of the intake air introducing passage 15 in the intake passage 3 and the joint portion a of the second burnt gas discharging passage 20 is large, there is no fear that the pressure difference between the upstream side and the downstream side of the combustion sleeve 142 would be excessively increased and there is no fear that the flow rate and flow amount of the intake air passing through the combustion sleeve 142 would be excessively increased. As a result, there is no fear that the combustion within the combustion sleeve 142 would become unstable.

Also, since the burnt gas discharged from the burnt gas discharging portion 146 of the combustion sleeve 142 is prevented from flowing into the burnt gas passage 201 by the reverse flow intake air through the burnt gas passage 201, there is no fear that the heat held by the above-described burnt gas would radiate to the cooling water. The burnt gas is discharged to the second burnt gas discharging passage 20.

Furthermore, when the above-described burnt gas is discharged from the second burnt gas discharging port 147, since the burnt gas is mixed with the intake air introduced into the combustion heater 14 through the first burnt gas discharging passage 16, the gas discharged from the above-described second burnt gas discharging port 147 becomes gas having a lower temperature than that of the burnt gas and a large heat quantity. There is no fear that the temperature of the valve mechanism 21 and the temperature of the second burnt gas discharging passage 20 would be excessively elevated. It is possible to enhance the durability and reliability of the valve mechanism 21 and the second burnt gas discharging passage 20.

As described above, if it is possible to feed the gas that has a large heat quantity, when the intake air is heated, it is possible to reduce the amount of the fuel to be burnt within the combustion heater 14.

Subsequently, in the case where the internal combustion engine 1 is started in the cold state, the valve mechanism 21 is opened to communicate the second burnt gas discharging port 147, and the actuator 8 drives the intake throttle valve 7 in the valve opening direction to a predetermined valve opening degree. The glow plug is subjected to current, the motor 150 operates the air blow fan 149 and the fuel pump 26 is operated to feed the fuel to the combustion sleeve 142.

In this case, as described above, the combustion heater 14 discharges the mixture gas of the high temperature burnt gas discharged from the combustion sleeve 142 and the intake air entrained into the combustion heater 14 through the first burnt gas discharging passage 16. Since the above-described mixture gas includes the intake air containing a great amount of oxygen, it is unnecessary to cause the air/fuel ratio (A/F) of the mixture to be burnt in the combustion sleeve 142 to be lean in order to keep the amount of oxygen which is required for the combustion of the internal combustion engine 1.

Incidentally, the opening degree of the valve mechanism 21 may be adjusted on the basis of the difference between the pressure at the joint portion of the intake air introducing passage 3 in the intake pipe 3 and the pressure at the joint portion of the second burnt gas discharging passage 20 in the intake pip 3.

Embodiment 3

An internal combustion engine with a combustion heater in accordance with a third embodiment of the present invention will now be described with reference to the drawings. In this case, the structure that is different from that of the above-described first embodiment will now be described and the explanation of the similar structure will be omitted.

Figure 10:
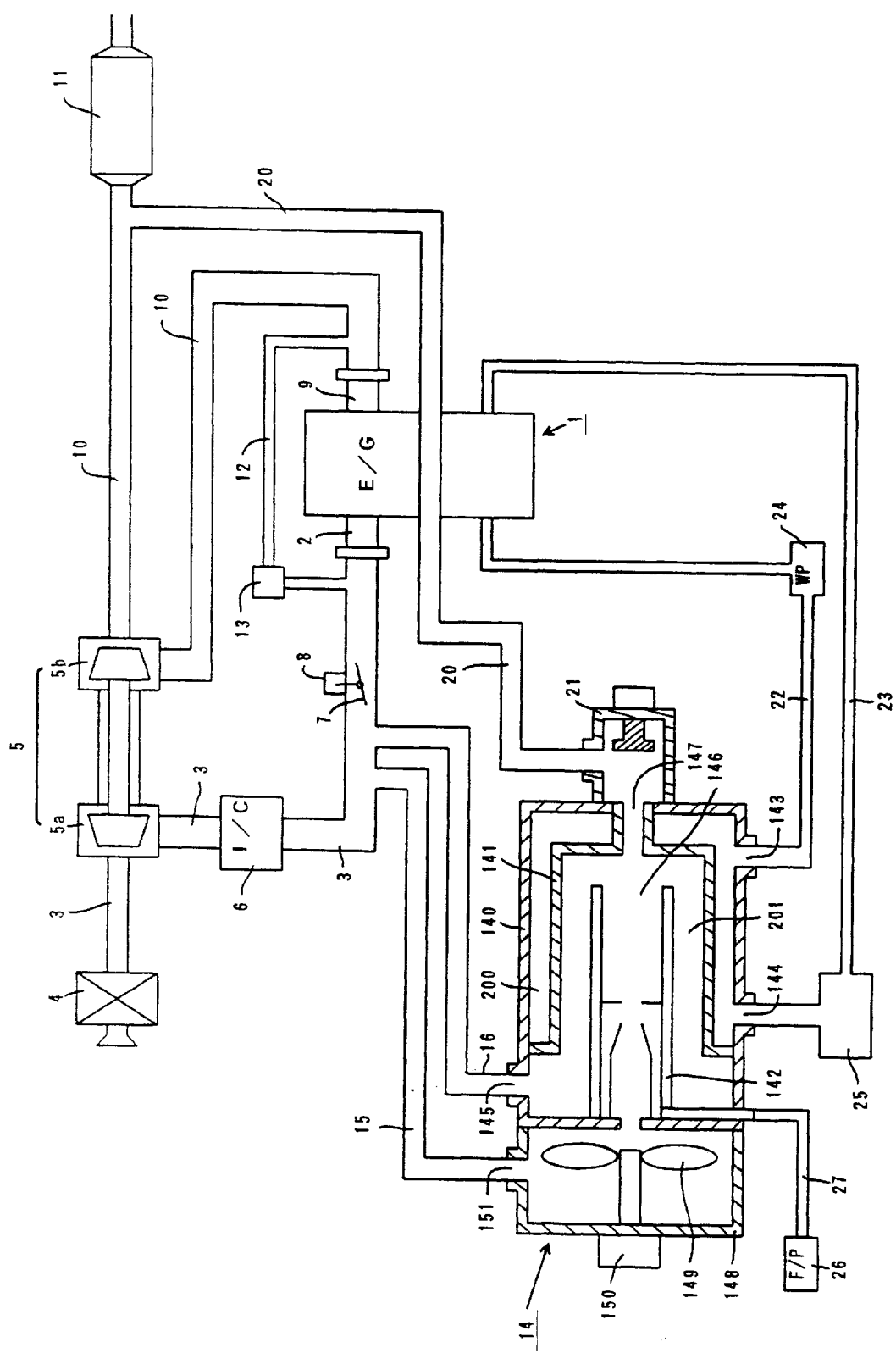
FIG. 10 is a view showing an internal combustion engine with a combustion heater in accordance with a third embodiment of the present invention.

FIG. 10 is a schematic view of the internal combustion engine with the combustion heater in accordance with the embodiment.

In this embodiment, the first burnt gas discharging port 145 of the combustion heater 14 is in direct communication with a portion upstream of the intake throttle valve 7 and downstream of the intake air introducing passage 15 in the intake pipe 3 through the first burnt gas discharging passage 16.

The second burnt gas discharging port 147 of the combustion heater 14 is in communication with a portion downstream of the turbine housing 5b in the exhaust pipe 10 and upstream of the exhaust gas purifying catalyst 11 through the valve mechanism 21 and the second burnt gas discharging passage 20.

In the thus constructed internal combustion engine with the combustion heater, for instance, in order to enhance the performance of the passenger room heating device and the acceleration of the heating of the body of the internal combustion engine 1 or in order to feed into the intake pipe 3 the burnt gas having a relatively small amount of heat quantity after the heat exchange with the cooling water, the valve mechanism 21 is closed to close the second burnt gas discharging port 147.

In this case, the high temperature burnt gas which has been burnt within the combustion sleeve 142 is discharged from the burnt gas discharging portion 146 by the pressure of the intake air fed out by the air blow fan 149 and is discharged from the first burnt gas discharging port 145 after the heat exchange with the cooling water through the burnt gas passage 201. The burnt gas discharged from the first burnt gas discharging port 145 is discharged to the intake pipe 3 through the first burnt gas discharging passage 16.

For instance, in the case where it is necessary to elevate the temperature of the exhaust gas purifying catalyst 11, the valve mechanism 21 is opened to communicate the second burnt gas discharging port 147.

In this case, since the joint portion of the first burnt gas discharging passage 16 and the joint portion of the intake air introducing pipe 15 in the intake pipe 3 are located downstream of the compressor housing 5a, and the joint portion of the second burnt gas discharging passage in the exhaust pipe 10 is located downstream of the turbine housing 5b, the pressure of the joint portion of the second burnt gas discharging passage 20 in the exhaust pipe 10 is lower than those of the joint portion of the first burnt gas discharging passage 16 and the joint portion of the intake air introducing pipe 15 in the intake pipe 3.

For this reason, the intake air is introduced from the intake air introducing passage 15 and simultaneously from the first burnt gas discharging passage 16 into the combustion heater 14.

The intake air that has been introduced into the combustion heater 14 through the above-described intake air introducing passage 15 is entrained into the housing 148 through the intake port 151, and subsequently introduced into the combustion sleeve 142 by the air blower fun 149 to be burnt together with the fuel in the combustion sleeve 142. The high temperature gas that has been burnt in the combustion sleeve 142 is discharged from the burnt gas discharging portion 146 of the combustion sleeve 142 to reach the second burnt gas discharging port 147.

On the other hand, the intake air that flows reversely through the above-described first burnt gas discharging passage 16 to be introduced into the combustion heater 14 is led to the burnt gas passage 201 through the first burnt gas discharging port 145 to flow reversely through the burnt gas passage 201 to reach the second burnt gas discharging port 147.

The burnt gas through the above-described combustion sleeve 142 and the intake air through the burnt gas passage 201 are discharged to the second burnt gas discharging passage 20 while being mixed with each other in the vicinity of the second burnt gas discharging port 147. The mixed gas discharged to the second burnt gas discharging passage 20 is introduced to the exhaust pipe 10 upstream of the exhaust gas purifying catalyst 11, and enters the exhaust gas purifying catalyst 11 together with the exhaust gas flowing from the upstream side of the exhaust pipe 10.

As a result, the exhaust gas purifying catalyst 11 is heated by the heat held by the mixture gas from the combustion heater 14.

Here, it should be noted that, since the intake air through the first burnt gas discharging passage 16 and the burnt gas passage 201 is fed to the second burnt gas discharging port 147, even if the pressure difference between the joint portion of the intake air introducing passage 15 in the intake pipe 3 and the joint portion of the second burnt gas discharging passage 20 in the exhaust pipe 10 is large, there is no fear that the pressure difference between the upstream side and the downstream side of the combustion sleeve 142 would be excessively increased and there is no fear that the flow rate and flow amount of the intake air passing through the combustion sleeve 142 would be excessively increased. As a result, there is no fear that the combustion within the combustion sleeve 142 would become unstable.

Also, since the burnt gas discharged from the burnt gas discharging portion 146 of the combustion sleeve 142 is prevented from flowing into the burnt gas passage 201 by the reverse flow intake air through the burnt gas passage 201, there is no fear that the heat held by the above-described burnt gas would radiate to the cooling water. The burnt gas is discharged to the second burnt gas discharging passage 20.

Furthermore, when the above-described burnt gas is discharged from the second burnt gas discharging port 147, since the burnt gas is mixed with the intake air introduced into the combustion heater 14 through the first burnt gas discharging passage 16, the gas discharged from the above-described second burnt gas discharging port 147 becomes gas having a lower temperature than that of the burnt gas and a large heat quantity. There is no fear that the temperature of the valve mechanism 21 and the temperature of the second burnt gas discharging passage 20 would be excessively elevated. It is possible to enhance the durability and reliability of the valve mechanism 21 and the second burnt gas discharging passage 20.

As described above, if it is possible to feed the gas that has a large heat quantity, when the intake air is heated, it is possible to reduce the amount of the fuel to be burnt within the combustion heater 14.

Incidentally, in the case where the mixture gas is fed from the second burnt gas discharging port 147 to the exhaust pipe 10, the feed amount of the mixture gas may be adjusted by controlling the opening degree of the valve mechanism 21 so that the reduction of the engine output and the reduction of the supercharged pressure by the excessive feed of the mixture gas may be suppressed.

Embodiment 4

An internal combustion engine with a combustion heater in accordance with a fourth embodiment of the present invention will now be described with reference to the drawings. In this case, the structure that is different from that of the above-described first embodiment will now be described and the explanation of the similar structure will be omitted.

Figure 11:
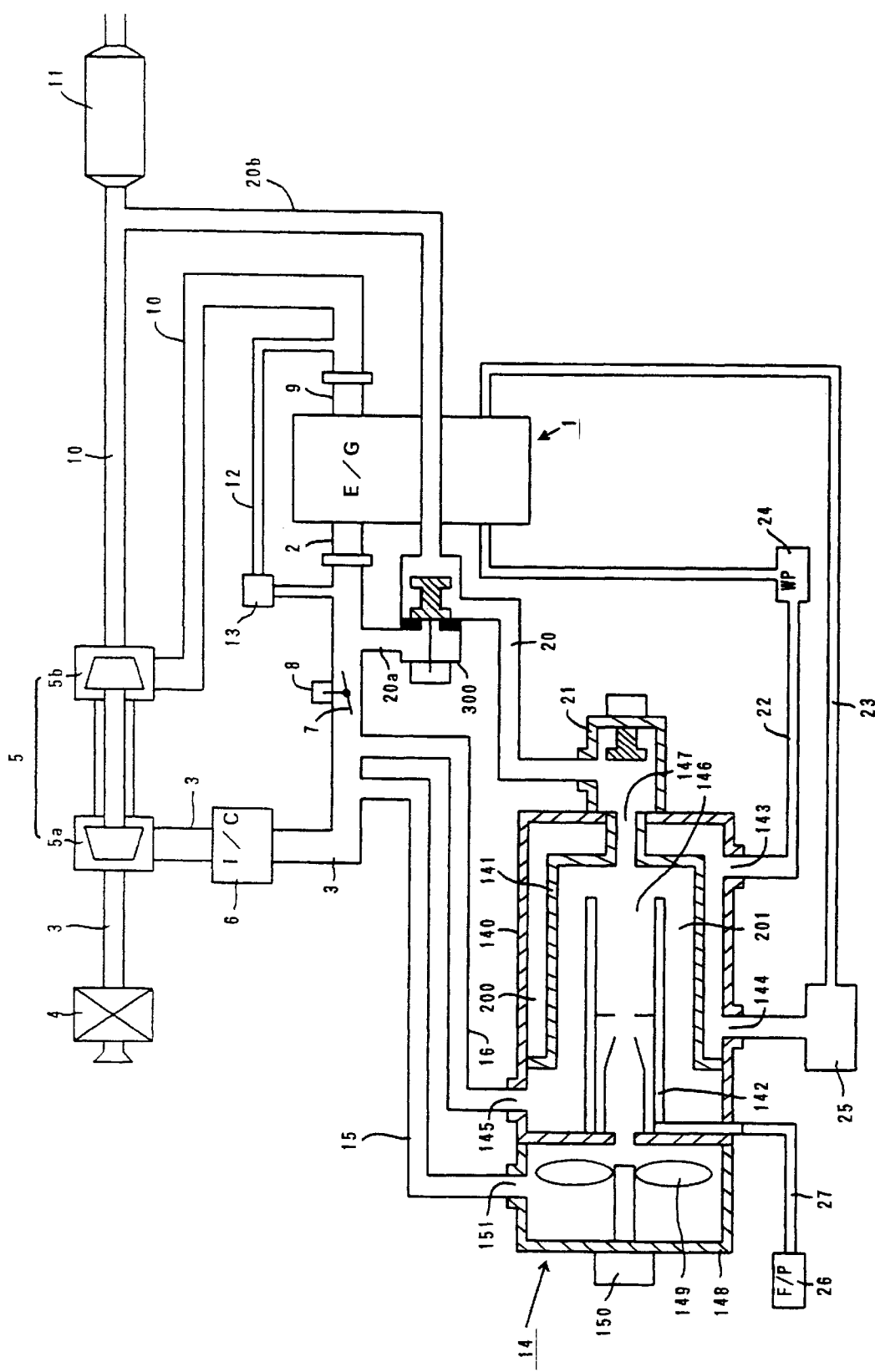
FIG. 11 is a view showing an internal combustion engine with a combustion heater in accordance with a fourth embodiment of the present invention.

FIG. 11 is a schematic view of the internal combustion engine with the combustion heater in accordance with the embodiment.

In this embodiment, the first burnt gas discharging port 145 of the combustion heater 14 is in direct communication with a portion upstream of the intake throttle valve 7 and downstream of the intake air introducing passage 15 in the intake pipe 3 through the first burnt gas discharging passage 16.

The second burnt gas discharging port 147 of the combustion heater 14 is connected to the three-way switching valve 300 through the valve mechanism 21 and the second burnt gas discharging passage 20.

In addition to the above-described burnt gas discharging passage 20, an intake side discharging passage 20a and an exhaust side discharging passage 20b are connected to the above-described three-way switching valve 300. The above-described intake side discharging passage 20a is connected to a portion downstream of the intake throttle valve 7 in the intake pipe 3 whereas the above-described exhaust side discharge passage 20b is connected to a portion downstream of the turbine housing 5b and upstream of the exhaust gas purifying catalyst 11 in the exhaust pipe 10.

The above-described three-way valve 300 selectively closes either one of the above-described intake side discharging passage 20a and the above-described exhaust side discharging passage 20b for switching the communication between the second burnt gas discharging passage 20 and the intake side discharging passage 20a and the communication between the second burnt gas discharging passage 20 and the exhaust side discharging passage 20b.

In the thus constructed internal combustion engine with the combustion heater, for instance, in order to enhance the performance of the passenger room heating device and the acceleration of the heating of the body of the internal combustion engine 1 or in order to feed into the intake pipe 3 the burnt gas having a relatively small amount of heat quantity after the heat exchange with the cooling water, the valve mechanism 21 is closed to close the second burnt gas discharging port 147.

In this case, the high temperature burnt gas which has been burnt within the combustion sleeve 142 is discharged from the burnt gas discharging portion 146 by the pressure of the intake air fed out by the air blow fan 149 and is discharged from the first burnt gas discharging port 145 after the heat exchange with the cooling water through the burnt gas passage 201. The burnt gas discharged from the first burnt gas discharging port 145 is discharged to the intake pipe 3 through the first burnt gas discharging passage 16.

Next, in the case where the temperature of the intake air of the internal combustion engine 1 is to be elevated, the valve mechanism 21 is opened to communicate the second burnt gas discharging port 147, and the three-way switching valve 300 closes the exhaust side discharging passage 20b to communicate the second burnt gas discharging passage 20 and the intake side discharging passage 20a with each other. The actuator 8 drives the intake throttle valve 7 in the valve closing direction to a predetermined opening degree as desired.

In this case, since the pressure at the joint portion of the second burnt gas discharging passage 20 in the intake pipe 3 is lower than that at the joint portion of the first burnt gas discharging passage 16 and that at the joint portion of the intake air introducing passage 15 in the intake pipe 3, the intake air is introduced from the intake air introducing passage 15 into the combustion heater 14 and at the same time the intake air is also introduced from the first burnt gas discharging passage 16 into the combustion heater 14 to thereby make it possible to obtain the same effect as that of the above-described second embodiment.

Also, in the case where the internal combustion engine 1 is started in the cold state, the valve mechanism 21 is opened to communicate the second burnt gas discharging port 147, the three-way switching valve 300 closes the exhaust side discharging passage 20b to communicate the second burnt gas discharging passage 20 and the intake side discharging passage 20a with each other, and the actuator 8 drives the intake throttle valve 7 in the valve closing direction to a predetermined valve opening degree. The glow plug is subjected to current, the motor 150 operates the air blow fan 149 and the fuel pump 26 is operated to feed the fuel to the combustion sleeve 142.

In this case, the intake air through the intake air introducing passage 15 from the intake pipe 3 is introduced into the combustion heater 14 and at the same time, the intake air through the first burnt gas discharging passage 16 from the intake pipe 3 is also introduced into the combustion heater 14 so that the pressure difference between the upstream side and the downstream side of the combustion sleeve 142 is suppressed, resulting the stability of the combustion of the combustion sleeve 142.

Then, the high temperature bunt gas discharged from the combustion sleeve 142 and the intake air entrained into the combustion heater 14 through the first burnt gas discharging passage 16 are discharged from the second burnt gas discharging port 147 of the combustion heater 14. the mixture gas is fed to the intake pipe 3 through the second burnt gas discharging passage 20 and the intake side discharging passage 20a and subsequently fed from the intake pipe 3 to the combustion chamber of the internal combustion engine 1.

In this case, since the above-described mixture gas includes the intake air containing an excessive amount of oxygen, it is unnecessary to cause the air/fuel ratio (A/F) of the mixture gas to be burnt in the combustion sleeve 142 to be lean in order to keep the amount of oxygen which is required for the combustion of the internal combustion engine 1.

Also, for example, in the case where the temperature of the exhaust gas purifying catalyst 11 is to be elevated, the valve mechanism 21 opens to communicate the burnt gas discharging port 147 and the three-way switching valve 300 closes the intake side discharging passage 20a to communicate the second burnt gas discharging passage 20 and the exhaust side discharging passage 20b with each other.

In this case, since the joint portion of the first burnt gas discharging passage 16 and the joint portion of the intake air introducing pipe 15 in the intake pipe 3 are located downstream of the compressor housing 5a, and the joint portion of the second burnt gas discharging passage in the exhaust pipe 10 is located downstream of the turbine housing 5b, the pressure of the joint portion of the second burnt gas discharging passage 20 in the exhaust pipe 10 is lower than those of the joint portion of the first burnt gas discharging passage 16 and the joint portion of the intake air introducing pipe 15 in the intake pipe 3.

As a result, the intake air is introduced from the intake air introducing passage 15 and simultaneously from the first burnt gas discharging passage 16 into the combustion heater 14. Accordingly, the same effect as that of the above-described third embodiment may be obtained.

Embodiment 5

An internal combustion engine with a combustion heater in accordance with a fifth embodiment of the present invention will now be described with reference to the drawings. In this case, the structure that is different from that of the above-described first embodiment will now be described and the explanation of the similar structure will be omitted.

Figure 12:
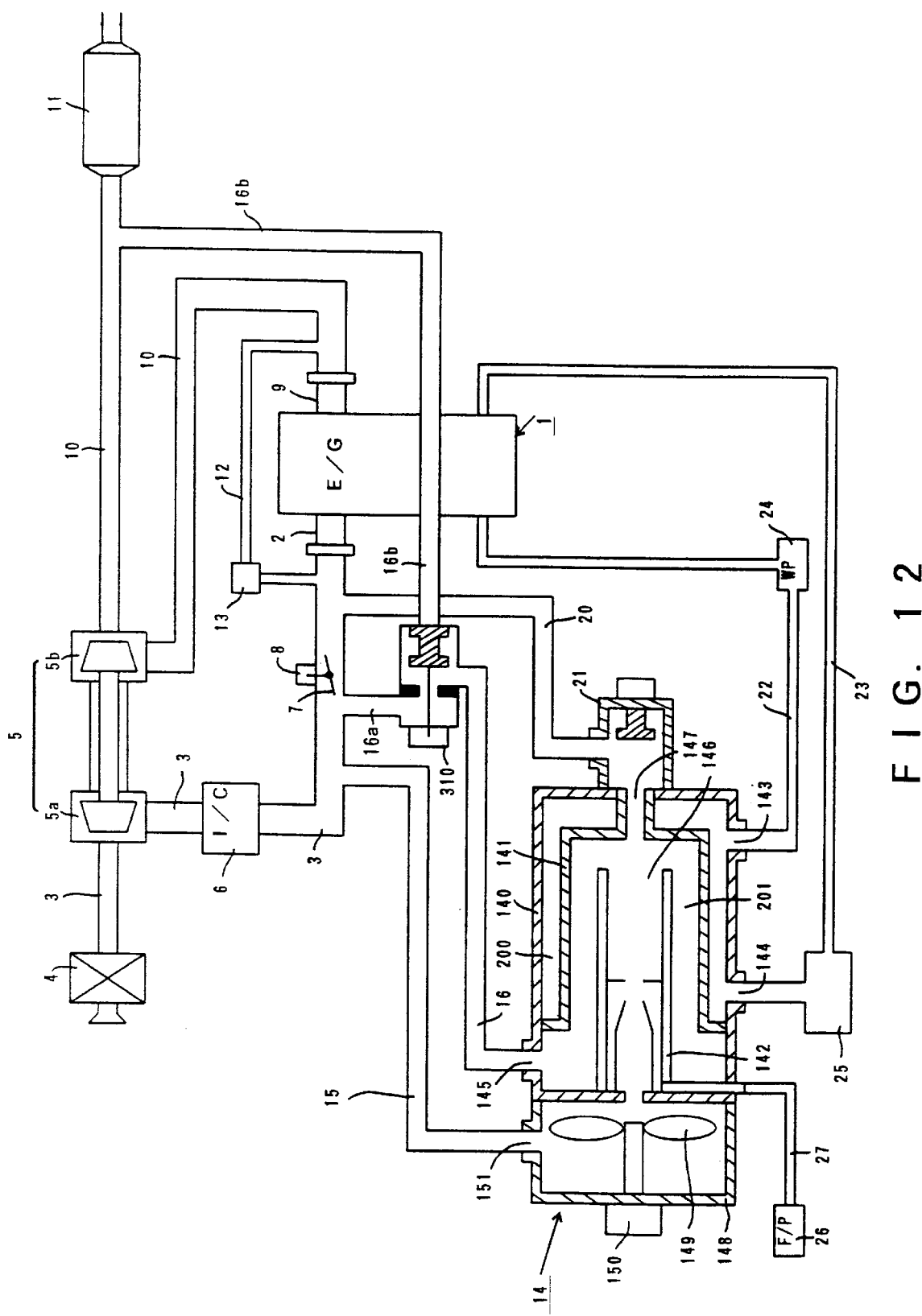
FIG. 12 is a view showing an internal combustion engine with a combustion heater in accordance with a fifth embodiment of the present invention.

FIG. 12 is a schematic view of the internal combustion engine with the combustion heater in accordance with the embodiment.

In this embodiment, the first burnt gas discharging port 145 of the combustion heater 14 is connected to the three-way switching valve 310 through the first burnt gas discharging passage 16.

In addition to the above-described first burnt gas discharging passage 16, an intake side discharging passage 16a and an exhaust side discharging passage 16b are connected to the above-described three-way switching valve 310. The above-described intake side discharging passage 16a is connected to a portion upstream of the intake throttle valve 7 in the intake pipe 3 and downstream of the joint portion of the intake air introducing pipe 15 in the intake pipe 3, whereas the above-described exhaust side discharge passage 16b is connected to a portion downstream of the turbine housing 5b and upstream of the exhaust gas purifying catalyst 11 in the exhaust pipe 10.

The above-described three-way valve 310 selectively closes either one of the intake side discharging passage 16a and the exhaust side discharging passage 16b for switching the communication between the first burnt gas discharging passage 16 and the intake side discharging passage 16a (closure of the exhaust side discharging passage 16b) and the communication between the first burnt gas discharging passage 16 and the exhaust side discharging passage 16b (intake side discharging passage 16a).

The second burnt gas discharging port 147 of the above-described combustion heater 14 is connected to a portion downstream of the intake throttle valve 7 in the intake pipe 3 through the valve mechanism 21 and the second burnt gas discharging passage 20.

In the thus constructed internal combustion engine with the combustion heater, for instance, in order to enhance the performance of the passenger room heating device and the acceleration of the heating of the body of the internal combustion engine 1 or in order to feed into the intake pipe 3 or into the exhaust pipe 10 the burnt gas having a relatively small amount of heat quantity after the heat exchange with the cooling water, the valve mechanism 21 is closed to close the second burnt gas discharging port 147.

In this case, the high temperature burnt gas which has been burnt within the combustion sleeve 142 is discharged from the burnt gas discharging portion 146 of the combustion sleeve 142 by the pressure of the intake air fed out by the air blow fan 149, and is discharged from the first burnt gas discharging port 145 after the heat exchange with the cooling water through the burnt gas passage 201.

The burnt gas discharged from the first burnt gas discharging port 145 is introduced into the first burnt gas discharging passage 16 to the three-way switching valve 310, introduced into either one of the intake side discharging passage 16a and the exhaust side discharging passage 16b by the three-way switching valve 310, and discharged to the intake pipe 3 or the exhaust pipe 10.

Next, in the case where the temperature of the intake air of the internal combustion engine 1 is to be elevated, the valve mechanism 21 is opened to communicate the second burnt gas discharging port 147, and the three-way switching valve 310 closes the exhaust side discharging passage 16b to communicate the first burnt gas discharging passage 16 and the intake side discharging passage 16a with each other.

In this case, since the pressure at the joint portion of the second burnt gas discharging passage 20 in the intake pipe 3 is lower than that at the joint portion of the intake side discharging passage 16a and that at the joint portion of the intake air introducing passage 15 in the intake pipe 3, the intake air is introduced from the intake pipe 3 through the intake air introducing passage 15 into the combustion heater 14 and at the same time also the intake air is introduced from the intake pipe 3 through the intake side discharging passage 16a and the first burnt gas discharging passage 16 into the combustion heater 14 to thereby make it possible to obtain the same effect as that of the above-described second embodiment.

Also, in the case where the internal combustion engine 1 is started in the cold state, the valve mechanism 21 is opened to communicate the second burnt gas discharging port 147, the three-way switching valve 310 closes the exhaust side discharging passage 16b to communicate the first burnt gas discharging passage 16 and the intake side discharging passage 16a with each other, and the actuator 8 drives the intake throttle valve 7 in the valve closing direction to a predetermined valve opening degree. The glow plug of the combustion sleeve 142 is applied with electric drive power, the motor 150 operates the air blow fan 149 and the fuel pump 26 is operated to feed the fuel to the combustion sleeve 142.

In this case, as described above, the combustion heater 14 discharges mixture gas of the high temperature burnt gas discharged from the combustion sleeve 142 and the mixture gas with the intake air entrained into the combustion heater 14 through the first burnt gas discharging passage 16 and the intake side discharging passage 16a. As a result, it is possible to obtain the same effect as that of the above-described second embodiment.

Embodiment 6

An internal combustion engine with a combustion heater in accordance with a sixth embodiment of the present invention will now be described with reference to the drawings. In this case, the structure that is different from that of the above-described first embodiment will now be described and the explanation of the similar structure will be omitted.

Figure 13:
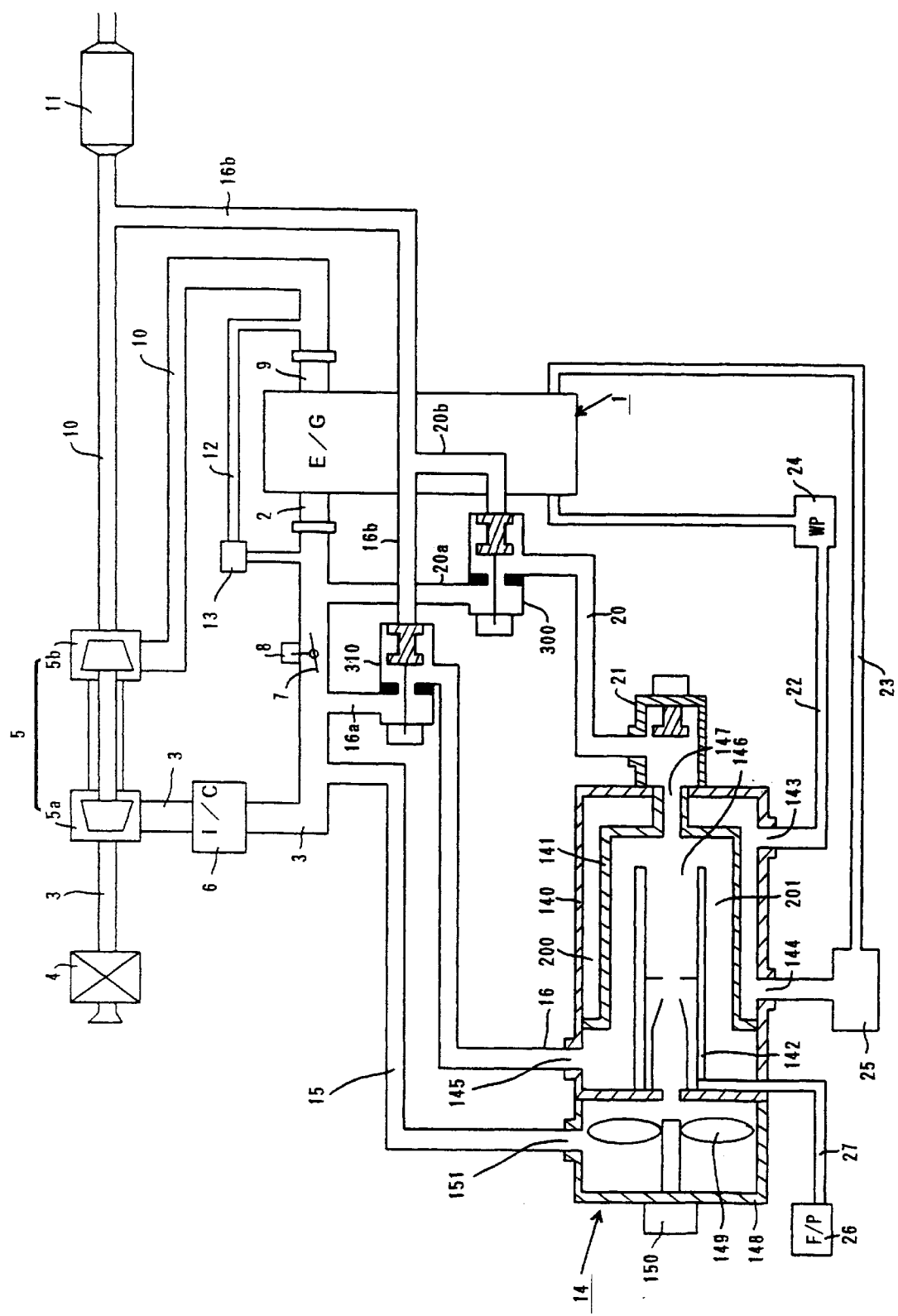
FIG. 13 is a view showing an internal combustion engine with a combustion heater in accordance with a sixth embodiment of the present invention.

FIG. 13 is a schematic view of the internal combustion engine with the combustion heater in accordance with the embodiment.

In this embodiment, the first burnt gas discharging port 145 of the combustion heater 14 is in communication with the first three-way switching valve 310 through the first burnt gas discharging passage 16.

In addition to the above-described first burnt gas discharging passage 16, an intake side discharging passage 16a and an exhaust side discharging passage 16b are connected to the above-described first three-way switching valve 310.

The above-described intake side discharging passage 16a is connected to a portion upstream of the intake throttle valve 7 in the intake pipe 3 and downstream of the joint portion of the intake air introducing pipe 15 in the intake pipe 3.

The above-described exhaust side discharging passage 16b is connected to a portion downstream of the turbine housing 5b and upstream of the exhaust gas purifying catalyst 11 in the exhaust pipe 10.

The above-described first three-way valve 310 selectively closes either one of the intake side discharging passage 16a and the exhaust side discharging passage 16b for switching the communication between the first burnt gas discharging passage 16 and the intake side discharging passage 16a (closure of the exhaust side discharging passage 16b) and the communication between the first burnt gas discharging passage 16 and the exhaust side discharging passage 16b (closure of the intake side discharging passage 16a).

Next, the second burnt gas discharging port 147 of the combustion heater 14 is connected to a second three-way switching valve 300 through the valve mechanism 21 and the second burnt gas discharging passage 20.

In addition to the above-described second burnt gas discharging passage 20, an intake side discharging passage 20a and an exhaust side discharging passage 20b are connected to the above-described second three-way switching valve 300.

The above-described intake side discharging passage 20a is connected to a portion downstream of the intake throttle valve 7 in the intake pipe 3 whereas the above-described exhaust side discharge passage 20b is connected to the above-described exhaust side discharging passage 16b.

The above-described second three-way switching valve 300 selectively closes either one of the above-described intake side discharging passage 20a and the above-described exhaust side discharging passage 20b for switching the communication between the second burnt gas discharging passage 20 and the intake side discharging passage 20a (closure of the exhaust side discharging passage 20b) and the communication between the second burnt gas discharging passage 20 and the exhaust side discharging passage 20b (closure of intake side discharging passage 20a).

In the thus constructed internal combustion engine with the combustion heater, for instance, in order to enhance the performance of the passenger room heating device and the acceleration of the heating of the body of the internal combustion engine 1 or in order to feed into the internal combustion engine 1 or the exhaust gas purifying catalyst 11 the burnt gas having a relatively small amount of heat quantity, the valve mechanism 21 is closed to close the second burnt gas discharging port 147.

In this case, the high temperature burnt gas which has been burnt within the combustion sleeve 142 is discharged from the burnt gas discharging portion 146 by the pressure of the intake air fed out by the air blow fan 149 and is discharged from the first burnt gas discharging port 145 after the heat exchange with the cooling water through the burnt gas passage 201.

The burnt gas discharged from the first burnt gas discharging port 145 is introduced into the three-way switching valve 310 through the first burnt gas discharging passage 16 and is introduced into either one of the intake side discharging passage 16a and the exhaust side discharging passage 16b by the three-way switching valve 310 to be discharged to the intake pipe 3 or the exhaust pipe 10.

Next, in the case where the temperature of the intake air of the internal combustion engine 1 is to be elevated, the valve mechanism 21 is opened to communicate the second burnt gas discharging port 147, and the first three-way switching valve 310 closes the exhaust side discharging passage 16b to communicate the first burnt gas discharging passage 16 and the intake side discharging passage 16a with each other. The second three-way switching valve 300 closes the exhaust side discharging passage 20b to communicate the second burnt gas discharging passage 20 and the intake side discharging passage 20a with each other. The actuator 8 drives the intake throttle valve 7 in the valve closing direction to a predetermined opening degree as required.

In this case, since the pressure at the joint portion of the intake side discharging passage 20a in the intake pipe 3 is lower than that at the joint portion of the intake side discharging passage 16a and that at the joint portion of the intake air introducing passage 15 in the intake pipe 3, the intake air is introduced through the intake air introducing passage 15 from the intake pipe 3 and at the same time also the intake air is introduced through the first burnt gas discharging passage 16 and the intake side discharging passage 20a from the intake pipe 3 to thereby make it possible to obtain the same effect as that of the above-described second embodiment.

Also, in the case where the internal combustion engine 1 is started in the cold state, the valve mechanism 21 is opened to communicate the second burnt gas discharging port 147, the first three-way switching valve 310 closes the exhaust side discharging passage 16b to communicate the first burnt gas discharging passage 16 and the intake side discharging passage 16a with each other, the second three-way switching valve 300 closes the exhaust side discharging passage 20b to communicate the second burnt gas discharging passage 20 and the intake side discharging passage 20a with each other, and the actuator 8 drives the intake throttle valve 7 in the valve closing direction to a predetermined valve opening degree as required.

Subsequently, the glow plug of the combustion sleeve 142 is subjected to electric drive power, the motor 150 operates the air blow fan 149 and the fuel pump 26 is operated to feed the fuel to the combustion sleeve 142.

In this case, as described above in conjunction with the above-described second embodiment, the combustion heater 14 discharges the high temperature gas discharged from the combustion sleeve 142 and the mixture gas with the intake air entrained into the combustion heater 14 through the first burnt gas discharging passage 16. Since the above-described mixture gas includes the intake air containing an excessive amount of oxygen, it is unnecessary to cause the air/fuel ratio (A/F) of the mixture gas to be burnt in the combustion sleeve 142 to be lean in order to keep the amount of oxygen which is required for the combustion of the internal combustion engine 1.

Next, for example, in the case where the temperature of the exhaust gas purifying catalyst 11 is to be elevated, the valve mechanism 21 opens to communicate the second burnt gas discharging port 147, the first three-way switching valve 310 closes the exhaust side discharging passage 16b to communicate with the first burnt gas passage 16 and the intake side discharging passage 16a with each other, and the second three-way switching valve 300 closes the intake side discharging passage 20a to communicate the second burnt gas discharging passage 20 and the exhaust side discharging passage 20b with each other.

In this case, since the joint portion of the exhaust side discharging passage 16a and the joint portion of the intake air introducing pipe 15 in the intake pipe 3 are located downstream of the compressor housing 5a, and the joint portion of the exhaust side discharging passage 20b in the exhaust pipe 10 is located downstream of the turbine housing 5b, the pressure of the joint portion of the exhaust side discharging passage 20b in the exhaust pipe 10 is lower than those of the joint portion of the intake side discharging passage 16a and the joint portion of the intake air introducing passage 15 in the intake pipe 3.

As a result, the intake air is introduced through the intake air introducing passage 15 from the intake pipe 3 into the combustion heater 14 and simultaneously introduced from the intake pipe 3 through the intake side discharging passage 16a into the combustion heater 14. Accordingly, the same effect as that of the above-described third embodiment may be obtained.

What is claimed is:

1. An internal combustion engine with a combustion heater, comprising:

an exhaust gas purifying catalyst provided in an exhaust passage of the internal combustion engine for purifying harmful gaseous components contained in exhaust gas;

a combustion heater including a combustion chamber that is independent of the internal combustion engine and a heat exchange portion for transmitting to an engine related element heat held by burnt gas that has been burnt in said combustion chamber;

a first burnt gas discharging means for discharging from said combustion heater the burnt gas which has passed through said heat exchange portion;

a second burnt gas discharging means for discharging from said combustion heater the burnt gas that has not yet passed through said heat exchange portion or that has passed through a part of said heat exchange portion; and a burnt gas passage controlling means for communicating at least one of said first burnt gas discharging means and said second burnt gas discharging means with a portion upstream of said exhaust gas purifying catalyst in said exhaust passage.

2. The internal combustion engine with a combustion heater according to claim 1, wherein temperature elevation demand of said exhaust gas purifying catalyst occurs, said burnt gas passage controlling means communicate said second burnt gas discharging means with the portion upstream of said exhaust gas purifying catalyst in the exhaust passage.

3. The internal combustion engine with a combustion heater according to claim 2, further comprising an intake throttle valve for reducing an amount of intake air flowing through an intake passage of the internal combustion engine if said second burnt gas discharging means is in communication with the portion upstream of said exhaust gas purifying catalyst in the exhaust passage.

4. The internal combustion engine with a combustion heater according to claim 1, wherein a supercharger for forcibly feeding fresh air to the internal combustion engine is provided in an intake passage of the internal combustion engine, and an intake air introducing passage for introducing air for combustion from the intake passage to said combustion heater is provided in a portion downstream of said supercharger in the intake passage.

* * * * *